US012734797B2

(12) United States Patent
Sasaki et al.

(10) Patent No.: US 12,734,797 B2
(45) Date of Patent: Sep. 15, 2026

(54) LIQUID EJECTION APPARATUS

(71) Applicant: BROTHER KOGYO KABUSHIKI KAISHA, Nagoya (JP)

(72) Inventors: Zenichiro Sasaki, Nagoya (JP); Kenta Horade, Tokai (JP); Masahiro Hayashi, Anjo (JP); Ryuji Horata, Gamagori (JP); Nobumasa Tanaka, Nagoya (JP); Takafumi Nakase, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 528 days.

(21) Appl. No.: 18/179,451

(22) Filed: Mar. 7, 2023

(65) Prior Publication Data

US 2023/0311482 A1 Oct. 5, 2023

(30) Foreign Application Priority Data

Mar. 29, 2022 (JP) ................................ 2022-052870

(51) Int. Cl.
*B41J 2/045* (2006.01)
*B41J 2/165* (2006.01)

(52) U.S. Cl.
CPC ........... *B41J 2/0451* (2013.01); *B41J 2/0458* (2013.01); *B41J 2/16508* (2013.01); *B41J 2/16523* (2013.01); *B41J 2/16526* (2013.01)

(58) Field of Classification Search
CPC ...... B41J 2/0451; B41J 2/165; B41J 2/16502; B41J 2/16505; B41J 2/16507; B41J 2/16508; B41J 2/16517; B41J 2/1652; B41J 2/16526; B41J 2/16523; B41J 2/2142
See application file for complete search history.

(56) References Cited

U.S. PATENT DOCUMENTS

2007/0139461 A1 6/2007 Izuo
2012/0229552 A1 * 9/2012 Sugahara ................. B41J 2/125 347/19
2013/0194335 A1 8/2013 Nodsu
(Continued)

FOREIGN PATENT DOCUMENTS

JP 2007-152889 A 6/2007
JP 2010-089376 A 4/2010
JP 2011-218666 A 11/2011
(Continued)

*Primary Examiner* — Scott A Richmond
(74) *Attorney, Agent, or Firm* — Merchant & Gould P.C.

(57) ABSTRACT

A controller performs: in a case where a particular condition is satisfied, acquiring abnormal nozzle information relating to numbers of first and second abnormal nozzles and a total number of abnormal nozzles; determining whether a purge is to be performed, the determining including determining that the purge is to be performed in a case where at least one of a plurality of purge conditions is satisfied, the plurality of purge conditions including a first purge condition that the number of the first abnormal nozzles is a first threshold or more, a second purge condition that the number of the second abnormal nozzles is a second threshold or more, and a third purge condition that the total number of abnormal nozzles is a third threshold or more; and in response to determining that the purge is to be performed, controlling a pump to perform the purge.

19 Claims, 12 Drawing Sheets

(56) References Cited

U.S. PATENT DOCUMENTS

| | | | |
|---|---|---|---|
| 2014/0300657 | A1 | 10/2014 | Ike |
| 2020/0362184 | A1 | 11/2020 | Mizutaki et al. |

FOREIGN PATENT DOCUMENTS

| | | | |
|---|---|---|---|
| JP | 2013-154561 | A | 8/2013 |
| JP | 2014-200982 | A | 10/2014 |
| JP | 2018-089842 | A | 6/2018 |
| JP | 2020-186292 | A | 11/2020 |
| JP | 2021-70279 | A | 5/2021 |

* cited by examiner

FIG. 10A

| FIRST PARTICULAR CONDITION | SECOND PARTICULAR CONDITION |
| --- | --- |
| 1. THE CUMULATIVE VALUE OF THE NUMBER OF RECORDED SHEETS SINCE THE PREVIOUS SUCTION PURGE HAS REACHED A PARTICULAR VALUE.<br>2. AN ABNORMALITY THAT AFFECTS INK EJECTION HAS OCCURRED.<br>3. RECORDING HAS BEEN PERFORMED ON A RECORDING SHEET THAT IS LONGER THAN OR EQUAL TO A PARTICULAR LENGTH.<br>4. RECORDING HAS BEEN PERFORMED ON RECORDING SHEETS OF A PARTICULAR NUMBER OR MORE. | 1. ..............................<br>2. ..............................<br>3. ..............................<br>•<br>•<br>•<br>• |

FIG. 10B

| | Hk | Hy | Hc | Hm | Hg |
| --- | --- | --- | --- | --- | --- |
| FIRST PARTICULAR CONDITION | Hk1 | Hy1 | Hc1 | Hm1 | Hg1 |
| SECOND PARTICULAR CONDITION | Hk2 (>Hk1) | Hy2 (>Hy1) | Hc2 (>Hc1) | Hm2 (>Hm1) | Hg2 (>Hg1) |

FIG. 10C

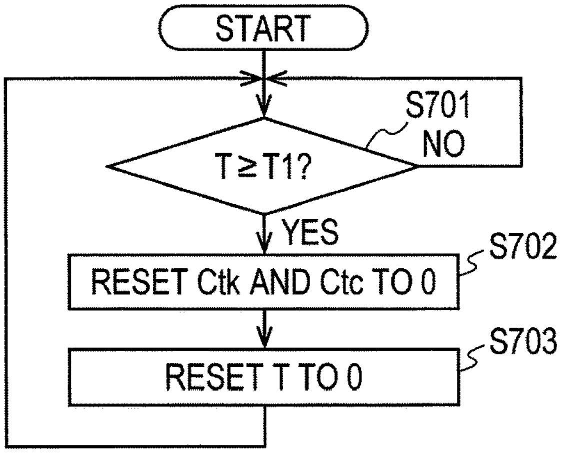

LIQUID EJECTION APPARATUS

REFERENCE TO RELATED APPLICATIONS

This application claims priority from Japanese Patent Application No. 2022-052870 filed on Mar. 29, 2022. The entire content of the priority application is incorporated herein by reference.

BACKGROUND ART

As an example of a liquid ejection apparatus that ejects liquid from nozzles, an inkjet printer that performs printing by ejecting ink from nozzles is known.

DESCRIPTION

In an inkjet printer, a nozzle check is performed for all nozzles of an inkjet head before executing printing. Then, cleaning is performed when the number of ejection failure nozzles is larger than or equal to a first threshold. Even if the number of ejection failure nozzles is smaller than the first threshold, when print data includes a command specifying a particular area and the number of ejection failure nozzles detected from the nozzle area corresponding to the particular area is larger than or equal to a second threshold different from the first threshold, cleaning is performed on a nozzle area corresponding to the particular area.

There is known a liquid ejection apparatus that performs purge by covering a plurality of nozzles with a cap and applying pressure to the ink in the head with a pump, as nozzle cleaning. In such a liquid ejection apparatus, it is conceivable to perform purge when the number of abnormal nozzles exceeds a threshold. In purge in some cases, a plurality of types of nozzles with different ejection conditions are covered with a common cap and ink is discharged.

In this case, for example, it is conceivable to set a threshold for the number of abnormal nozzles in all the nozzles covered by the cap and determine whether to perform purge. However, in this case, in a case where the number of abnormal nozzles in a specific type of nozzle is large but the number of abnormal nozzles in all the nozzles covered by the cap is smaller than the threshold, purge is not performed and the quality of the recorded image may become deteriorated.

Alternatively, for example, it is conceivable to set a threshold for the number of abnormal nozzles individually for each nozzle type and determine whether to perform purge. However, in this case, in a case where the number of abnormal nozzles for each type of nozzle is smaller than the threshold but the total number of abnormal nozzles is large, purge is not performed and the quality of the recorded image may become deteriorated.

In view of the foregoing, an example of an object of this disclosure is to provide a liquid ejection apparatus configured to perform purge by covering a plurality of types of nozzles having different ejection conditions with a common cap and to perform purge appropriately according to the number of abnormal nozzles.

According to one aspect, this specification discloses a liquid ejection apparatus. The liquid ejection apparatus includes a head, a cap, a pump, and a controller. The head includes a plurality of types of nozzle groups. Each of the plurality of types of nozzle groups is formed by nozzles. The plurality of types of nozzle groups have different liquid ejection conditions. The plurality of types of nozzle groups include a first nozzle group and a second nozzle group. The cap is configured to cover the nozzles forming the plurality of types of nozzle groups. The pump is configured to apply pressure to liquid in the head. The controller is configured to perform: in a case where a particular condition is satisfied, acquiring abnormal nozzle information, the abnormal nozzle information relating to a number of first abnormal nozzles, a number of second abnormal nozzles, and a total number of abnormal nozzles, the first abnormal nozzles being abnormal nozzles having abnormality in ejection of liquid among the nozzles forming the first nozzle group, the second abnormal nozzles being the abnormal nozzles among the nozzles forming the second nozzle group, the total number of abnormal nozzles being a total number of the abnormal nozzles among the nozzles forming at least two nozzle groups of the plurality of types of nozzle groups; determining, based on the abnormal nozzle information, whether a purge is to be performed, the determining including determining that the purge is to be performed in a case where at least one of a plurality of purge conditions is satisfied, the plurality of purge conditions including a first purge condition that the number of the first abnormal nozzles is larger than or equal to a first threshold, a second purge condition that the number of the second abnormal nozzles is larger than or equal to a second threshold, and a third purge condition that the total number of abnormal nozzles is larger than or equal to a third threshold; and in response to determining that the purge is to be performed, controlling the pump to perform the purge, the purge being discharging liquid from the nozzles forming the plurality of types of nozzle groups by driving the pump in a state where the cap covers the nozzles forming the plurality of types of nozzle groups. Thus, whether to perform the purge is determined appropriately and the purge is performed appropriately according to the number of abnormal nozzles.

According to another aspect, a controller is configured to perform: in a case where a particular condition is satisfied, acquiring abnormal nozzle information, the abnormal nozzle information relating to a number of first abnormal nozzles, a number of second abnormal nozzles, and a total number of abnormal nozzles, the first abnormal nozzles being abnormal nozzles having abnormality in ejection of liquid among the nozzles forming the first nozzle group, the second abnormal nozzles being the abnormal nozzles among the nozzles forming the second nozzle group, the total number of abnormal nozzles being a total number of the abnormal nozzles among the nozzles forming at least two nozzle groups of the plurality of types of nozzle groups; determining, based on the abnormal nozzle information, whether a first purge is to be performed or a second purge is to be performed, the second purge being a purge in which liquid is discharged from the nozzles more strongly than the first purge, the purge being discharging liquid from the nozzles forming the plurality of types of nozzle groups by driving the pump in a state where the cap covers the nozzles forming the plurality of types of nozzle groups, the determining including: determining that the second purge is to be performed in a case where at least one of a plurality of purge conditions is satisfied, the plurality of purge conditions including a first purge condition that the number of the first abnormal nozzles is larger than or equal to a first threshold, a second purge condition that the number of the second abnormal nozzles is larger than or equal to a second threshold, and a third purge condition that the total number of abnormal nozzles is larger than or equal to a third threshold; and determining that the first purge is to be performed in a case where none of the plurality of purge conditions is satisfied; in response to determining that the first purge is to be performed, controlling the pump to perform the first purge; and in response to determining that the second purge is to be performed, controlling the pump to perform the second purge. Thus, whether to perform the first purge or the second purge is determined appropriately and the purge is performed appropriately according to the number of abnormal nozzles.

FIG. 10A is a diagram for explaining first and second particular conditions.

FIG. 10B is a diagram for explaining thresholds set when the first and second particular conditions are satisfied.

FIG. 10C is a flowchart showing a flow of processing for resetting a count value of suction purge.

FIRST EMBODIMENT

A first embodiment of the present disclosure will be described below.

<Overall Configuration of Printer>

Figure 1:
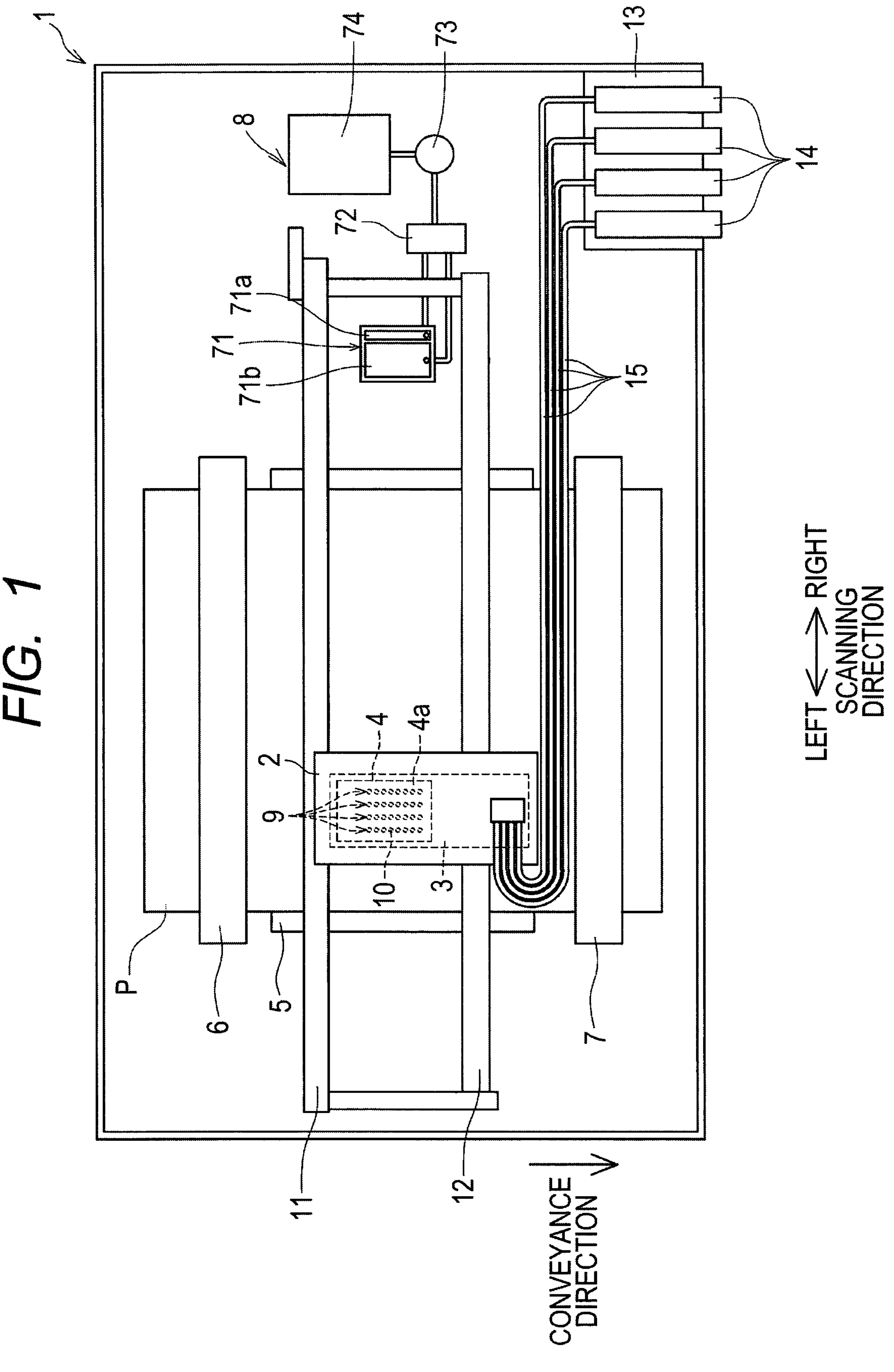
FIG. 1 is a diagram showing a schematic configuration of a printer.

As shown in FIG. 1, a printer 1 (an example of "liquid ejection apparatus") according to the first embodiment includes a carriage 2, a sub-tank 3, an inkjet head 4 (an example of "head"), a platen 5, conveyance rollers 6 and 7 (an example of "conveyor"), a maintenance unit 8 (an example of "purge unit"), and so on.

The carriage 2 is supported by two guide rails 11 and 12 extending in a scanning direction. In the following description, right and left sides in the scanning direction are defined as shown in FIG. 1. The carriage 2 is connected to a carriage motor 86 (see FIG. 4) via a belt (not shown) and so on. When the carriage motor 86 is driven, the carriage 2 moves along the guide rails 11 and 12 in the scanning direction.

The sub-tank 3 is mounted on the carriage 2. Here, the printer 1 includes a cartridge holder 13. Four ink cartridges 14 are detachably attached to the cartridge holder 13. The four ink cartridges 14 mounted on the cartridge holder 13 are arranged in the scanning direction, and store ink of black, yellow, cyan, and magenta (an example of "liquid") in order from the right side in the scanning direction.

The inkjet head 4 is mounted on the carriage 2 and connected to the lower end of the sub-tank 3. The inkjet head 4 is supplied with ink of the four colors from the sub-tank 3. The inkjet head 4 ejects ink from a plurality of nozzles 10 formed on a nozzle surface 4*a*, which is the lower surface thereof. More specifically, the plurality of nozzles 10 are arranged in a conveyance direction to form a nozzle array 9 (an example of "nozzle group"), and four nozzle arrays 9 are arranged in the scanning direction on the nozzle surface 4*a*. Ink of black, yellow, cyan, and magenta is ejected from the plurality of nozzles 10 in order from the nozzle array 9 on the right side in the scanning direction.

As described above, in the first embodiment, the colors of ink ejected from the nozzles 10 are different among the four nozzle arrays 9. Thus, the viscosity of the ink ejected from the nozzles 10 and whether the ink ejected from the nozzles 10 contains a pigment or a dye differ among the four nozzle arrays 9. That is, in the first embodiment, the characteristics of the ink ejected from the nozzles 10 differ among the four nozzle arrays 9. Accordingly, in the first embodiment, ink ejection conditions of the nozzles 10 differ among the four nozzle arrays 9.

In the first embodiment, one of the three nozzle arrays 9 on the left side is an example of "first nozzle group", another nozzle array 9 is an example of "second nozzle group", and the remaining one nozzle array 9 is an example of "third nozzle group".

The platen 5 is arranged below the inkjet head 4 and faces the plurality of nozzles 10. The platen 5 extends over the entire length of a recording sheet P in the scanning direction and supports the recording sheet P from below. The conveyance roller 6 is arranged upstream of the inkjet head 4 and the platen 5 in the conveyance direction. The conveyance roller 7 is arranged downstream of the inkjet head 4 and the platen 5 in the conveyance direction. The conveyance rollers 6 and 7 are connected to a conveyance motor 87 (see FIG. 4) via gears (not shown). When the conveyance motor 87 is driven, the conveyance rollers 6 and 7 rotate and the recording sheet P is conveyed in the conveyance direction.

The maintenance unit 8 includes a cap 71, a switching unit 72, a suction pump 73, and a waste liquid tank 74. The cap 71 is arranged on the right side of the platen 5 in the scanning direction. The cap 71 has two cap portions 71*a* and 71*b* arranged in the scanning direction. When the carriage 2 is located at a maintenance position on the right side of the platen 5 in the scanning direction, the plurality of nozzles 10 face the cap 71. More specifically, when the carriage 2 is located at the maintenance position, the rightmost nozzle array 9 faces the cap portion 71*a*, and the left three nozzle arrays 9 face the cap portion 71*b*.

Figure 4:
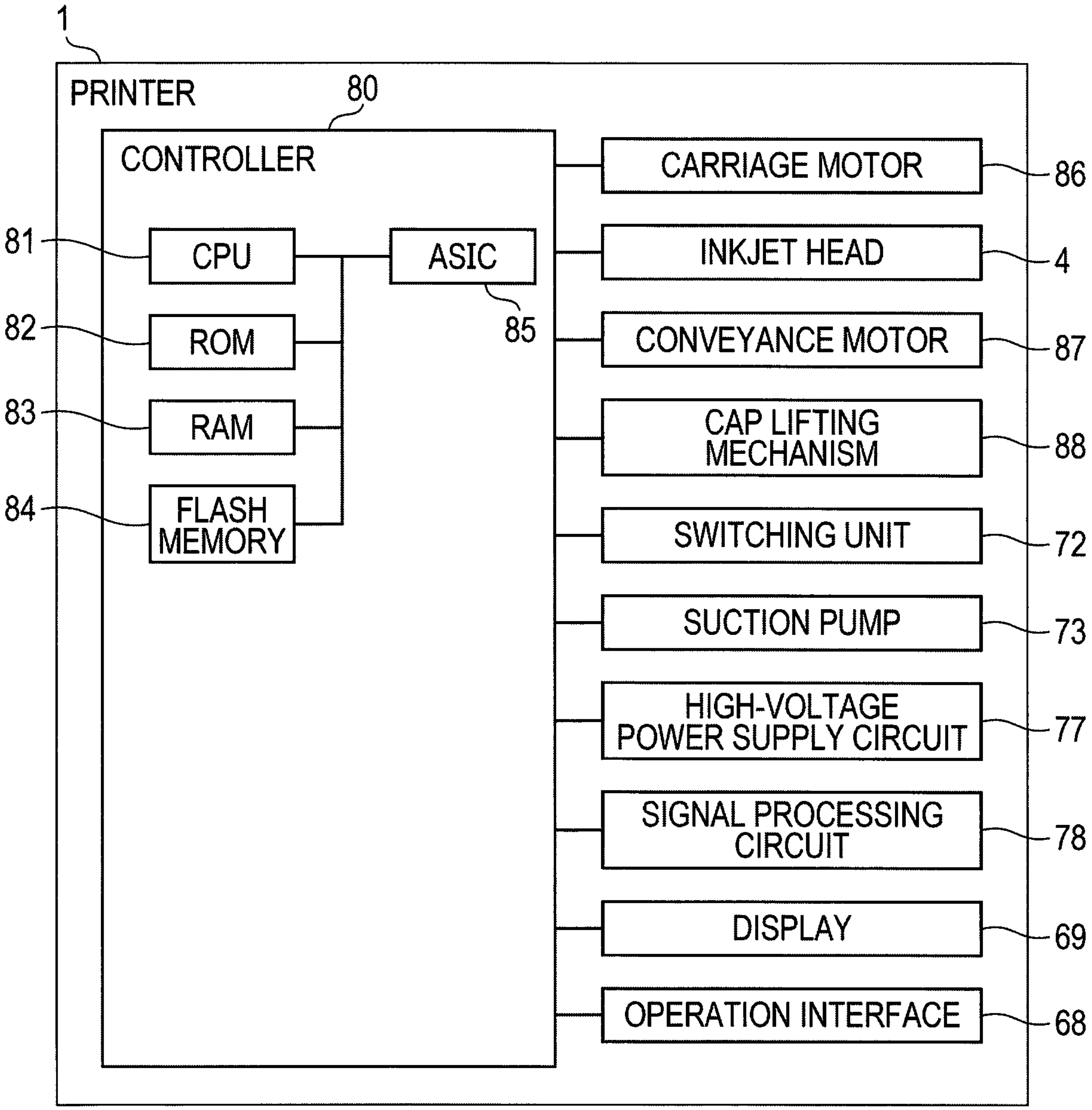
FIG. 4 is a block diagram showing an electrical configuration of the printer.

The cap 71 is connected to a cap lifting mechanism 88 (see FIG. 4). When the cap lifting mechanism 88 is driven, the cap 71 moves up and down. When the cap 71 is lifted by the cap lifting mechanism 88 in a state where the carriage 2 is located at the maintenance position and the plurality of nozzles 10 and the cap 71 face each other, the upper end of the cap 71 comes into close contact with the nozzle surface 4*a*. As a result, the plurality of nozzles 10 forming the rightmost nozzle array 9 are covered with the cap portion 71*a*, and the plurality of nozzles 10 forming the three left-side nozzle arrays 9 are covered with the cap portion 71*b*, which is a capped state. In a state where the cap 71 is lowered, the plurality of nozzles 10 are not covered with the cap 71. Note that the cap 71 is not limited to covering the plurality of nozzles 10 by being in close contact with the nozzle surface 4*a*. The cap 71 may cover the plurality of nozzles 10 by being in close contact with, for example, a frame (not shown) arranged around the nozzle surface 4*a* of the inkjet head 4.

The switching unit 72 is connected to the cap portions 71*a* and 71*b*. The switching unit 72 is also connected to the suction pump 73. The switching unit 72 selectively connects one of the cap portions 71*a* and 71*b* to the suction pump 73.

The suction pump 73 is a tube pump and so on, and is connected to the switching unit 72 and the waste liquid tank 74. In the maintenance unit 8, when the suction pump 73 is driven in a state where the nozzles 10 are the capped state and the cap portion 71*a* is connected to the suction pump 73 by the switching unit 72, black suction purge is performed in which black ink in the inkjet head 4 is discharged from the plurality of nozzles 10 forming the rightmost nozzle array 9. In the maintenance unit 8, when the suction pump 73 is driven in a state where the nozzles 10 are the capped state and the cap portion 71*b* is connected to the suction pump 73 by the switching unit 72, color suction purge is performed in which color ink (yellow, cyan, and magenta ink) in the inkjet head 4 is discharged from the plurality of nozzles 10 forming the three left-side nozzle arrays 9. The ink discharged by the black and color suction purge is stored in the waste liquid tank 74.

Figure 2:
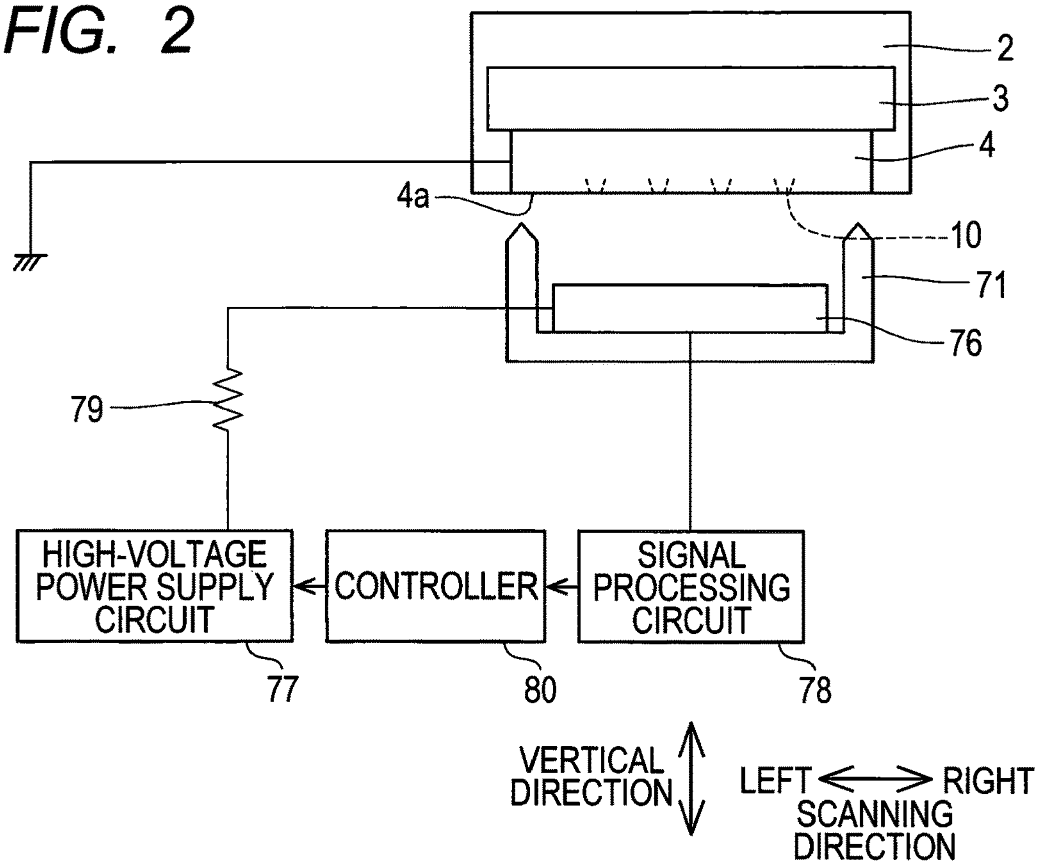
FIG. 2 is a diagram for explaining electrodes arranged in a cap, and connection relationships among the electrodes, a high-voltage power supply circuit, and a signal processing circuit.

As shown in FIG. 2, electrodes 76 each having a rectangular planar shape are arranged inside the cap 71 (inside the cap portions 71*a* and 71*b*). The electrode 76 is connected to a high-voltage power supply circuit 77 via a resistor 79. The high-voltage power supply circuit 77 applies a particular voltage (for example, approximately 600 V) to the electrode 76 when inspection driving described later is performed. On the other hand, the inkjet head 4 is held at ground potential. Thereby, a particular potential difference is generated between the inkjet head 4 and the electrode 76. A signal processing circuit 78 is connected to the electrode 76. The signal processing circuit 78 includes a differentiating circuit and so on, and outputs a signal corresponding to the voltage of the electrode 76. Alternatively, the signal output from the signal processing circuit 78 may be a current signal.

In a state where the nozzles 10 are the capped state and a voltage is applied to the electrode 76 by the high-voltage power supply circuit 77 and the inspection driving described later is not performed, the voltage of the signal output from the signal processing circuit 78 is a voltage V0 shown in FIGS. 3A and 3B.

In the first embodiment, inspection driving for ejecting ink from the nozzle 10 of the inkjet head 4 toward the electrode 76 may be performed in a state where the nozzles 10 are the capped state and a voltage is applied to the electrode 76 by the high-voltage power supply circuit 77.

When ink is ejected from the nozzle 10 by inspection driving, the ink ejected from the nozzle 10 is charged. Thus, the potential of the electrode 76 changes until the charged ink approaches the electrode 76 and the ink lands on the electrode 76. After the charged ink lands on the electrode 76, the potential of the electrode 76 attenuates and returns to the potential before the ink was ejected.

Figure 3A:
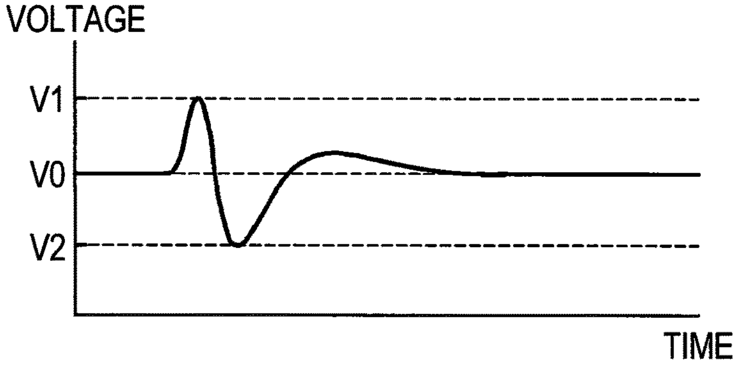
FIG. 3A is a diagram showing a signal output from the signal processing circuit when ink is ejected from a nozzle in inspection driving.

At this time, as shown in FIG. 3A, the signal output from the signal processing circuit 78 rises from voltage V0 to voltage V1 higher than voltage V0, drops to voltage V2 lower than voltage V0, and then repeats rising and falling while attenuating, and returns to voltage V0. Thus, the signal output from the signal processing circuit 78 has a maximum value of voltage V1 and a minimum value of voltage V2.

Figure 3B:
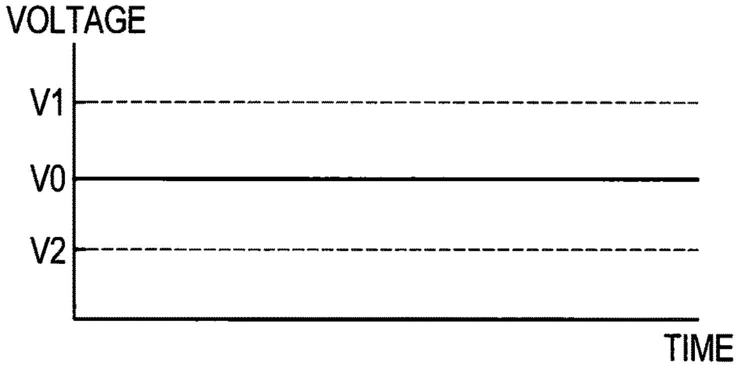
FIG. 3B is a diagram showing a signal output from the signal processing circuit when ink is not ejected from a nozzle in inspection driving.

On the other hand, when ink is not ejected from the nozzle 10 by inspection driving, the signal output from the signal processing circuit 78 does not substantially change from the voltage V0 as shown in FIG. 3B.

As described above, in the first embodiment, the signal output from the signal processing circuit 78 differs depending on whether ink is ejected from the nozzle 10 by inspection driving. In the first embodiment, this fact is used to determine whether the nozzle 10 is an abnormal nozzle that has an abnormality in ink ejection.

In the first embodiment, a particular voltage is applied to the electrode 76, the inkjet head 4 is held at the ground potential, and the signal processing circuit 78 outputs a signal corresponding to the voltage of the electrode 76. However, the present disclosure is not limited to this. It may be configured such that, by holding the electrode 76 at the ground potential and applying a particular voltage to the inkjet head 4, a potential difference is generated between the electrode 76 and the inkjet head 4, and the signal processing circuit 78 is connected to the inkjet head 4 and outputs a signal corresponding to the voltage of the inkjet head 4.

<Electrical Configuration of Printer>

Next, the electrical configuration of the printer 1 will be described. As shown in FIG. 4, the printer 1 includes a controller 80. The controller 80 includes a CPU (Central Processing Unit) 81, a ROM (Read Only Memory) 82, a RAM (Random Access Memory) 83, a flash memory 84 (an example of "memory"), an ASIC (Application Specific Integrated Circuit) 85, and so on. The controller 80 controls operations of the carriage motor 86, the inkjet head 4, the conveyance motor 87, the cap lifting mechanism 88, the switching unit 72, the suction pump 73, the high-voltage power supply circuit 77, and so on. The controller 80 receives signals from the signal processing circuit 78 and so on.

The printer 1 also includes a display 69 and an operation interface 68, in addition to the configuration described above. The display 69 is, for example, a liquid crystal display provided on the housing of the printer 1. The controller 80 controls the display 69 to display information necessary for the operations and so on of the printer 1 on the display 69. The operation interface 68 includes buttons provided on the housing of the printer 1, a touch panel provided on the display 69, and so on. The operation interface 68 receives a signal based on a user's operation and transmits the received signal to the controller 80.

The controller 80 may be configured such that the CPU 81 performs various processes, the ASIC 85 performs various processes, or the CPU 81 and the ASIC 85 cooperate to perform various processes. Further, the controller 80 may be configured such that one CPU 81 performs processing alone, or a plurality of CPUs 81 may share the processing. Further, the controller 80 may be configured such that one ASIC 85 performs processing alone, or a plurality of ASICs 85 may share the processing.

<Processing for Performing Suction Purge>

Next, the processing of the controller 80 for performing suction purge in the printer 1 will be described. While power is being supplied to the printer 1, such as when a plug (not shown) of the printer 1 is connected to a commercial power supply, the controller 80 performs suction purge by performing processing according to the flow of FIG. 5A.

Figure 5A:
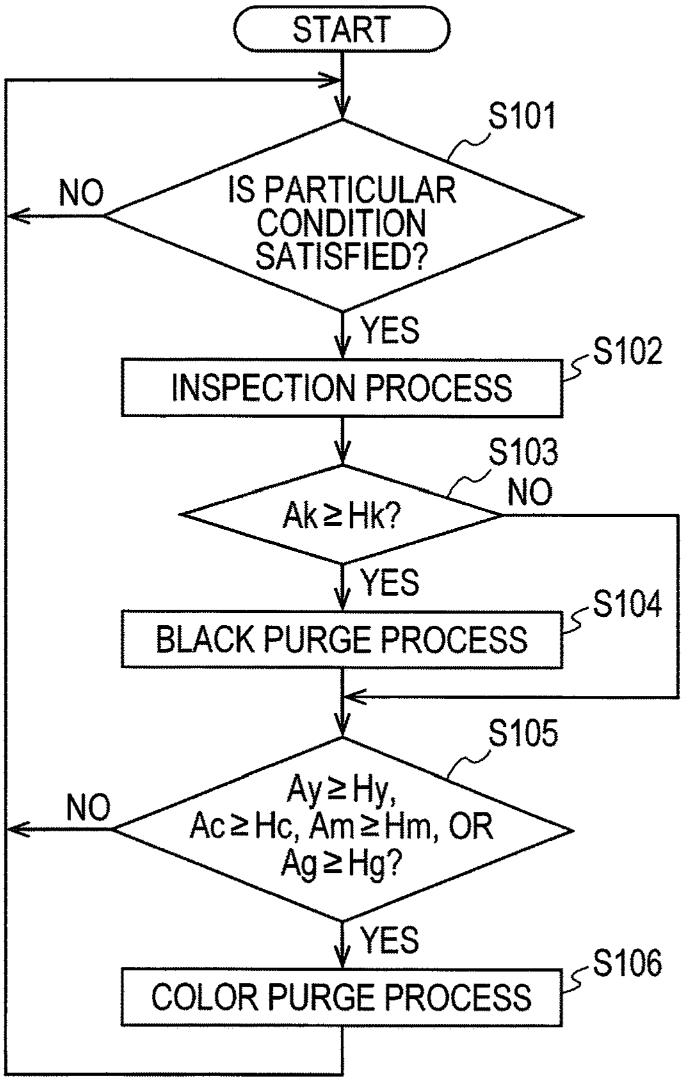
FIG. 5A is a flowchart showing a flow of processing performed when power is being supplied to the printer.
Figure 5B:
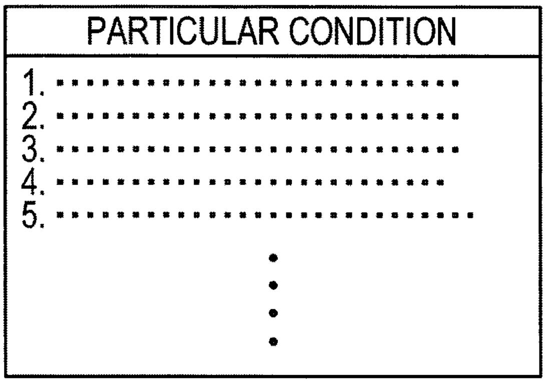
FIG. 5B is a diagram for explaining particular conditions.

To explain the flow of FIG. 5A, the controller 80 determines whether a particular condition is satisfied (S101). The particular condition is a condition under which the number of abnormal nozzles in the inkjet head 4 may change. In the first embodiment, the flash memory 84 stores a list of particular conditions as shown in FIG. 5B. As one example, the particular conditions may be the same as first particular conditions shown in FIG. 10A and described later. In S101, it is determined that the particular condition is satisfied when any one of these conditions is satisfied.

The controller 80 waits while the particular condition is not satisfied (S101: NO). When the particular condition is satisfied, the controller 80 subsequently executes an inspection process (S102). In the inspection process, the controller 80 causes the inkjet head 4 to perform inspection driving for each of the plurality of nozzles 10 in a state where the nozzles 10 are the capped state and a voltage is applied to the electrode 76 by the high-voltage power supply circuit 77. The controller 80 acquires abnormal nozzle information indicating whether each nozzle 10 is an abnormal nozzle based on the signal output from the signal processing circuit 78 when the inspection driving is performed.

Subsequently, based on the abnormal nozzle information acquired in S102, the controller 80 determines whether a number Ak of abnormal nozzles (the number of black abnormal nozzles) in the rightmost nozzle array 9 is larger than or equal to a threshold Hk (S103). If the number Ak of abnormal nozzles is smaller than the threshold Hk (S103: NO), the process proceeds to S105. If the number Ak of abnormal nozzles is larger than or equal to the threshold Hk (S103: YES), the controller 80 executes a black purge process (S104) and then the process proceeds to S105. In the black purge process, the controller 80 controls the switching unit 72, the suction pump 73, and so on to perform the black suction purge described above.

In S105, the controller 80 determines whether any one of the conditions is satisfied based on the abnormal nozzle information acquired in S102 (“determination process”). The conditions include a condition that a number Ay of abnormal nozzles (the number of yellow abnormal nozzles) in the second nozzle array 9 from the right is larger than or equal to a threshold Hy, a condition that a number Ac of abnormal nozzles (the number of cyan abnormal nozzles) in the third nozzle array 9 from the right is larger than or equal to a threshold Hc, and a condition that a number Am of abnormal nozzles (the number of magenta abnormal nozzles) in the leftmost nozzle array 9 is larger than or equal to a threshold Hm, and a condition (“third purge condition”) that a total number Ag (=Ay+Ac+Am) of abnormal nozzles, which is the sum of the numbers of abnormal nozzles in the three nozzle arrays 9 on the left side is larger than or equal to a threshold Hg (“third threshold”). The thresholds Hy, Hc, and Hm are different values. The threshold Hg is larger than the thresholds Hy, Hc, and Hm and smaller than the sum (Hy+Hc+Hm) of the thresholds Hy, Hc, and Hm.

In the first embodiment, the abnormal nozzle in the nozzle array 9 corresponding to the first nozzle group is an example of “first abnormal nozzle”, the abnormal nozzle in the nozzle array 9 corresponding to the second nozzle group is an example of “second abnormal nozzle”, and the abnormal nozzle in the nozzle array 9 corresponding to the third nozzle group is an example of “third abnormal nozzle”. Among the numbers of abnormal nozzles Ay, Ac, and Am, the number of abnormal nozzles in the nozzle array 9 corresponding to the first nozzle group is an example of “number of first abnormal nozzles”, the number of abnormal nozzles in the nozzle array 9 corresponding to the second nozzle group is an example of “number of second abnormal nozzles”, and the number of abnormal nozzles in the nozzle array 9 corresponding to the third nozzle group is an example of “number of third abnormal nozzles”.

In the first embodiment, among the thresholds Hy, Hc, and Hm, the threshold set for the number of the first abnormal nozzles is an example of “first threshold”, the threshold set for the number of the second abnormal nozzles is an example of “second threshold”, and the threshold set for the number of the third abnormal nozzles is an example of “fourth threshold”. Among the condition that the number of abnormal nozzles Ay is larger than or equal to the threshold Hy, the condition that the number of abnormal nozzles Ac is larger than or equal to the threshold Hc, and the condition that the number of abnormal nozzles Am is larger than or equal to the threshold Hm, the condition corresponding to the number of first abnormal nozzles and the first threshold is an example of “first purge condition”, the condition corresponding to the number of second abnormal nozzles and the second threshold is an example of “second purge condition”, and the condition corresponding to the number of third abnormal nozzles and the fourth threshold is an example of “fourth purge condition”.

If none of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg is satisfied (S105: NO), the process returns to S101. If at least one of these conditions is satisfied (S105: YES), the controller 80 executes a color purge process (S106) and then, the process returns to S101. In the color purge process, the controller 80 controls the switching unit 72, the suction pump 73, and so on to perform the color suction purge described above.

<Effects>

In the first embodiment, ink is discharged from nozzles that eject yellow, cyan, and magenta inks by color suction purge. In the first embodiment, color suction purge is performed when the number Ay of abnormal nozzles is larger than or equal to the threshold Hy, when the number Ac of abnormal nozzles is larger than or equal to the threshold Hc, when the number Am of abnormal nozzles is larger than or equal to the threshold Hm, when the total number Ag of abnormal nozzles, which is the sum of the numbers Ay, Ac, and Am of nozzles, is larger than or equal to the threshold Hg. As a result, color suction purge is performed when the number Ay of abnormal nozzles is large, when the number Ac of abnormal nozzles is large, and when the number Am of abnormal nozzles is large. Further, even though the number Ay, Ac, or Am of abnormal nozzles is not so large, color suction purge is also performed when the total number Ag of abnormal nozzles, which is the sum of the numbers, is large. Thus, color suction purge is appropriately performed according to the number of abnormal nozzles.

In the first embodiment, color suction purge is performed by covering a plurality of nozzles 10 forming the three nozzle arrays 9 with the cap portion 71*b*, the nozzle arrays having different ink characteristics such as the color of ink ejected from the nozzle 10, whether the ink ejected from the nozzle 10 contains a pigment or dye, or the viscosity of the ink ejected from the nozzle 10. The color suction purge is appropriately performed according to the number of abnormal nozzles.

In the first embodiment, by setting the threshold Hy, the threshold Hc, and the threshold Hm to different values, color suction purge is appropriately performed according to the number of abnormal nozzles in each of the three nozzle arrays 9 that eject color ink.

In the first embodiment, the threshold Hg is larger than the thresholds Hy, Hc, and Hm and smaller than the sum (Hy+Hc+Hm) of these values. As a result, even when the number Ay of abnormal nozzles is smaller than the threshold Hy, the number Ac of abnormal nozzles is smaller than the threshold Hc, and the number Am of abnormal nozzles is smaller than the threshold Hm, the color suction purge is performed when the total number Ag of abnormal nozzles is larger than or equal to the threshold Hg. Thus, when the numbers Ay, Ac, or Am of abnormal nozzles are not so large but the total number Ag of abnormal nozzles is large, the suction purge is performed.

SECOND EMBODIMENT

Next, a second embodiment will be described. The second embodiment also relates to the printer 1 similarly to that of the first embodiment. In the second embodiment, while power is being supplied to the printer 1, the controller 80 causes the suction purge to be performed by performing processing according to the flow of FIG. 6.

Figure 6:
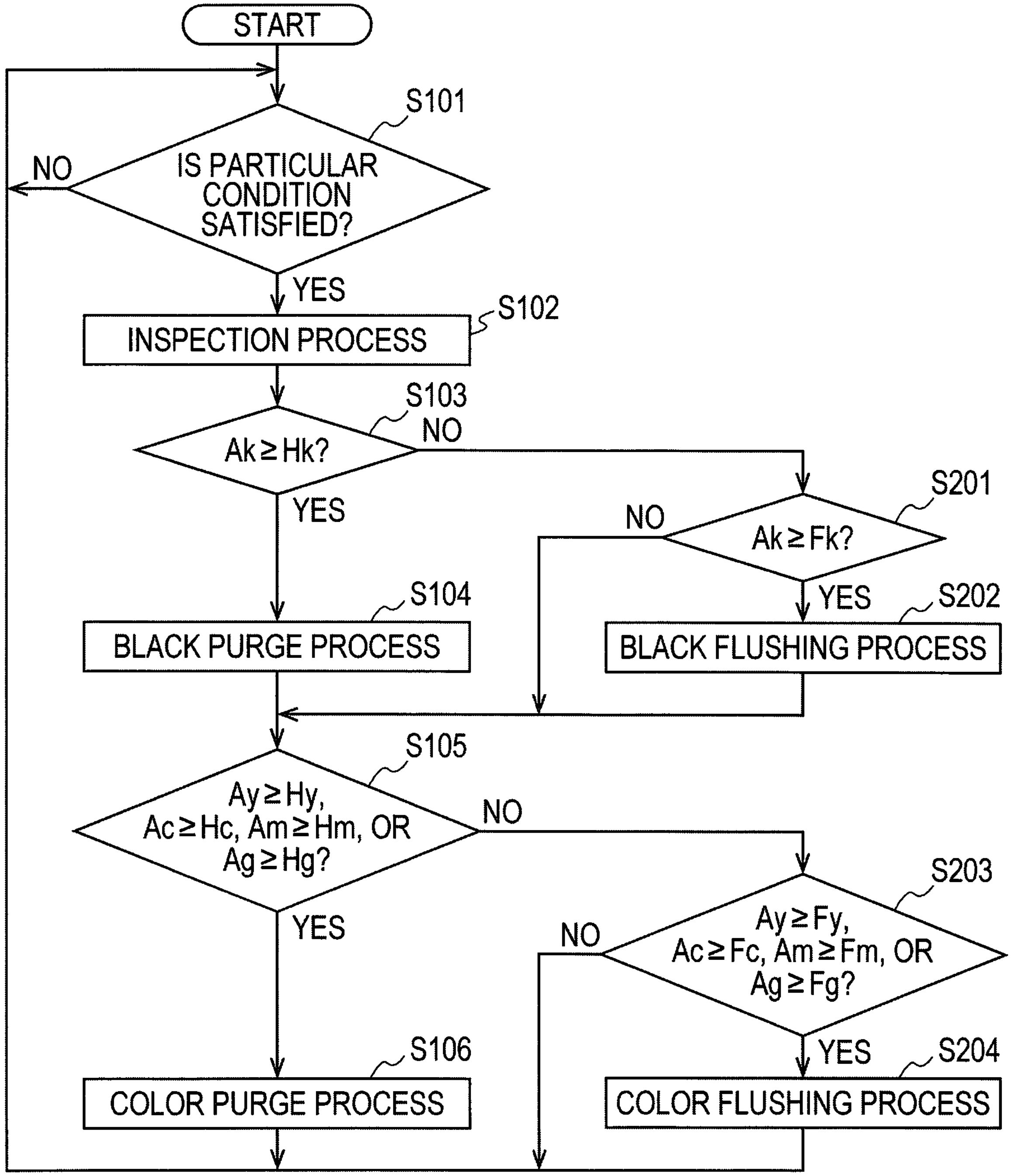
FIG. 6 is a flowchart showing a flow of processing performed when power is being supplied to a printer.

Referring to the flow of FIG. 6, the controller 80 executes the processes of S101 to S103 similarly to the first embodiment. If the number Ak of abnormal nozzles is larger than or equal to the threshold Hk (S103: YES), the controller 80 executes the black purge process (S104) and then the process proceeds to S105, as in the first embodiment. If the number Ak of abnormal nozzles is smaller than the threshold Hk (S103: NO), the controller 80 determines whether the number Ak of abnormal nozzles is larger than or equal to a threshold Fk (S201). The threshold Fk is a value smaller than the threshold Hk. If the number Ak of abnormal nozzles is smaller than the threshold Fk (S201: NO), the process proceeds to S105. If the number Ak of abnormal nozzles is larger than or equal to the threshold Fk (S201: YES), the controller 80 executes a black flushing process (S202), and then the process proceeds to S105. In the black flushing process, the controller 80 causes the inkjet head 4 to perform black flushing to discharge black ink from the abnormal nozzles in the rightmost nozzle array 9.

In S105, when at least one of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg is satisfied (S105: YES), the controller 80 executes the color purge process (S106), and then, the process returns to S101 as in the first embodiment.

If none of these conditions is satisfied (S105: NO), the controller 80 determines whether any one of the conditions including the condition that the number Ay of abnormal nozzles is larger than or equal to a threshold Fy, the condition that the number Ac of abnormal nozzles is larger than or equal to a threshold Fc, the condition that the number Am of abnormal nozzles is larger than or equal to a threshold Fm, and the condition that the total number Ag of abnormal nozzles is larger than or equal to a threshold Fg (S203). The threshold Fy is a value smaller than the threshold Hy. The threshold Fc is a value smaller than the threshold Hc. The threshold Fm is a value smaller than the threshold Hm. The threshold Fg is a value smaller than the threshold Hg. In the second embodiment, among the thresholds Fy, Fc, and Fm, the threshold corresponding to the number of abnormal nozzles in the nozzle array 9 corresponding to the first nozzle group is an example of "fifth threshold (flushing threshold)".

If none of the conditions including the condition that the number Ay of abnormal nozzles is larger than or equal to the threshold Fy, the condition that the number Ac of abnormal nozzles is larger than or equal to the threshold Fc, the condition that the number Am of abnormal nozzles is larger than or equal to the threshold Fm, and the total number Ag of abnormal nozzles is larger than or equal to the threshold Fg is satisfied (S203: NO), the process returns to S101. If at least one of these conditions is satisfied, the controller 80 executes the color flushing process (S204), and then, the process returns to S101. In the color flushing process, the controller 80 causes the inkjet head 4 to perform color flushing for discharging color ink from the abnormal nozzles in the three nozzle arrays 9 on the left side.

<Effects>

In the second embodiment, even if it is determined not to perform color suction purge, color flushing is performed when any one of the conditions including the condition that the number Ay of abnormal nozzles is larger than or equal to the threshold Fy, the condition that the number Ac of abnormal nozzles is larger than or equal to the threshold Fc, the number Am of abnormal nozzles is larger than or equal to the threshold Fm, and the condition that the total number Ag of abnormal nozzles is larger than or equal to the threshold Fg is satisfied. As a result, when the number of abnormal nozzles is small, the abnormal nozzles are restored while suppressing the amount of ink discharged.

THIRD EMBODIMENT

Next, a third embodiment will be described. The third embodiment also relates to the printer 1 similarly to the first and second embodiments. In the third embodiment, while power is being supplied to the printer 1, the controller 80 causes the suction purge to be performed by performing processing according to the flow of FIG. 7.

Figure 7:
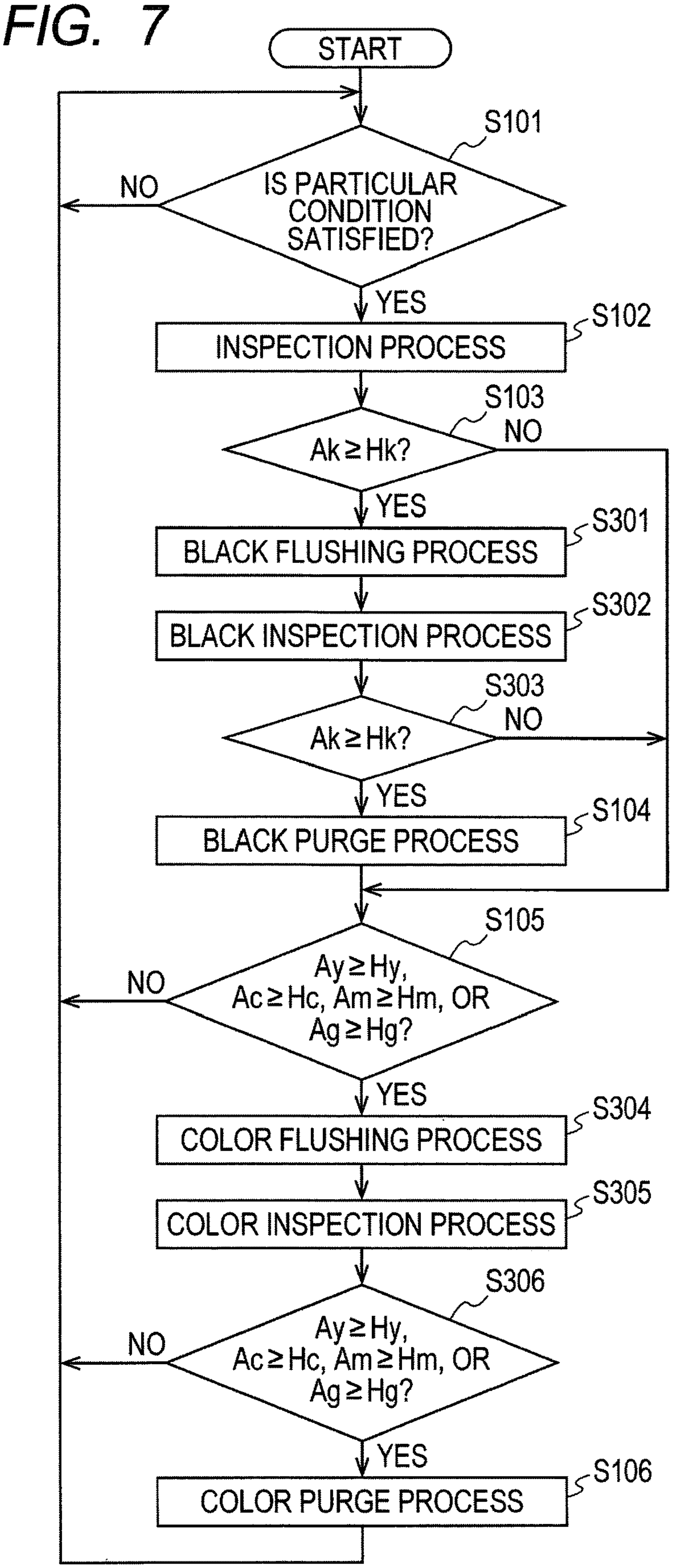
FIG. 7 is a flowchart showing a flow of processing performed when power is being supplied to a printer.

Referring to the flow of FIG. 7, the controller 80 executes the processes of S101 to S103 as in the first embodiment. If the number Ak of abnormal nozzles is smaller than the threshold Hk (S103: NO), the process proceeds to S105.

If the number Ak of abnormal nozzles is larger than or equal to the threshold Hk (S103: YES), the controller 80 executes the same black flushing process as in S202 of the second embodiment (S301). Subsequently, the controller 80 executes a black inspection process (S302). In the black inspection process, the controller 80 causes the inkjet head 4 to perform inspection driving for each of the plurality of nozzles 10 forming the rightmost nozzle array 9, that is, each of the plurality of nozzles 10 that eject black ink. The controller 80 acquires abnormal nozzle information for these nozzles 10 based on the signal output from the signal processing circuit 78 when the inspection driving is performed.

Subsequently, based on the abnormal nozzle information acquired in S302, the controller 80 determines again whether the number Ak of abnormal nozzles is larger than or equal to the threshold Hk (S303). If the number Ak of abnormal nozzles is smaller than the threshold Hk (S303: NO), the process proceeds to S105. If the number Ak of abnormal nozzles is larger than or equal to the threshold Hk (S303: YES), the controller 80 executes the black purge process (S104), and then the process proceeds to S105.

In S105, if none of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the total number Ag of abnormal nozzles is larger than or equal to the threshold Hg is satisfied (S105: NO), the process returns to S101.

If at least one of these conditions is satisfied (S105: YES), the controller 80 executes the same color flushing process as in S204 of the second embodiment (S304). Subsequently, the controller 80 executes a color inspection process (S305). In the color inspection process, the controller 80 causes the inkjet head 4 to perform inspection driving for each of the plurality of nozzles 10 forming the three nozzle arrays 9 on the left side, that is, each of the plurality of nozzles 10 that eject color ink. The controller 80 acquires abnormal nozzle information about these nozzles 10 based on the signal output from the signal processing circuit 78 when the inspection driving is performed.

Subsequently, based on the abnormal nozzle information acquired in S305, the controller 80 again makes the same determination as in S105 (S306). If none of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg is satisfied (S306: NO), the process returns to S101. If at least one of these conditions is satisfied (S306: YES), the controller 80 executes the color purge process (S106), and then, the process returns to S101.

<Effects>

In the third embodiment, the color flushing is performed when at least one of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the total number Ag of abnormal nozzles is larger than or equal to the threshold Hg is satisfied, and the color suction purge is performed when at least one of the conditions is satisfied. As a result, the amount of ink discharged is suppressed by not performing the color suction purge when the abnormal nozzles are recovered to some extent by the color flushing.

FOURTH EMBODIMENT

Next, a fourth embodiment will be described. The fourth embodiment also relates to the printer 1 similarly to the first to third embodiments. In the fourth embodiment, while power is being supplied to the printer 1, the controller 80 performs processing according to the flow of FIG. 8A.

Figure 8A:
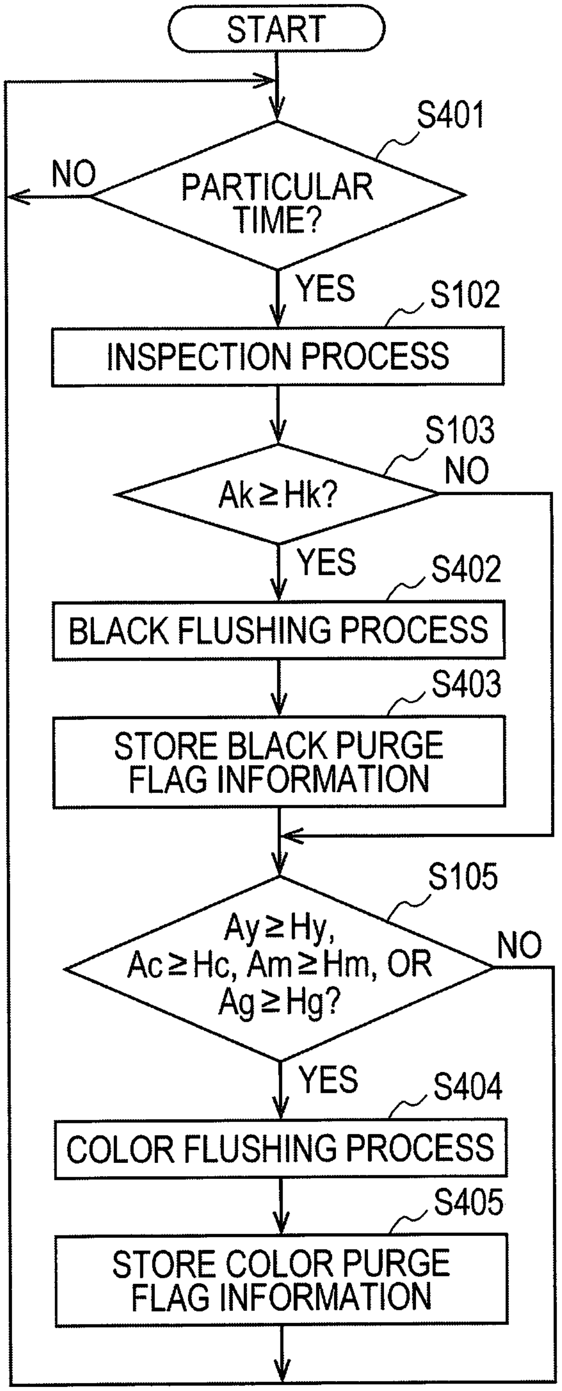
FIG. 8A is a flowchart showing a flow of processing performed when power is being supplied to a printer.

To explain the flow of FIG. 8A, the controller 80 waits while a particular time has not come (S401: NO), and executes the processes of S102 and S103 similarly to the first embodiment when the particular time has come (S401: YES). In the third embodiment, the condition that the particular time has come is an example of "particular condition".

If the number Ak of abnormal nozzles is smaller than the threshold Hk (S103: NO), the process proceeds to S105. If the number Ak of abnormal nozzles is larger than or equal to the threshold Hk (S103: YES), the controller 80 executes the black flushing process (S402), stores black purge flag information in the flash memory 84 (S403), and the process proceeds to S105.

In S105, if none of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the total number Ag of abnormal nozzles is larger than or equal to the threshold Hg is satisfied (S105: NO), the process returns to S401.

If at least one of these conditions is satisfied (S105: YES), the controller 80 executes the color flushing process (S404), stores color purge flag information in the flash memory 84 (S405), and then the process returns to S401.

Figure 8B:
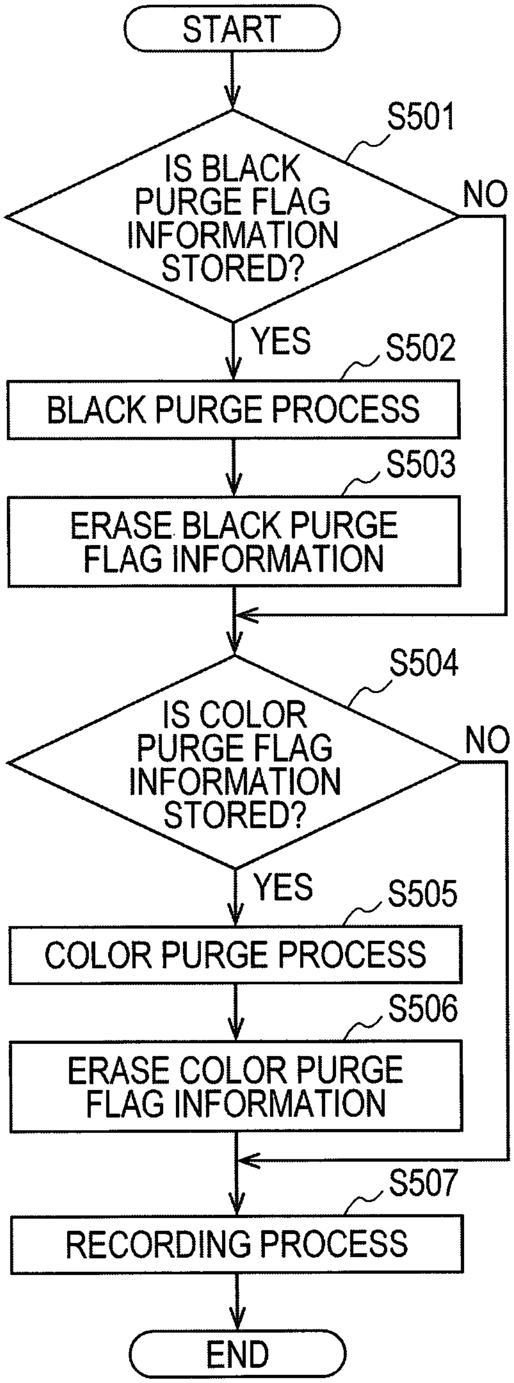
FIG. 8B is a flowchart showing a flow of processing when a print command is input.

In the fourth embodiment, upon receiving a recording command for recording on the recording sheet P, the controller 80 performs processing according to the flow shown in FIG. 8B. For example, when the user operates the operation interface 68 to give an instruction to perform recording on the recording sheet P, the operation interface 68 transmits a recording command, and the controller 80 receives this recording command.

To explain the flow of FIG. 8B, first, the controller 80 determines whether the black purge flag information is stored in the flash memory 84 (S501). If the black purge flag information is not stored in the flash memory 84 (S501: NO), the process proceeds to S504. If the black purge flag information is stored in the flash memory 84 (S501: YES), the controller 80 executes a black purge process (S502) and erases the black purge flag information stored in the flash memory 84 (S503), and then, the process proceeds to S504.

In S504, the controller 80 determines whether the color purge flag information is stored in the flash memory 84. If the color purge flag information is not stored in the flash memory 84 (S504: NO), the process proceeds to S507. If the color purge flag information is stored in the flash memory 84 (S504: YES), the controller 80 executes a color purge process (S505) and erases the color purge flag information stored in the flash memory 84 (S506), and then, the process proceeds to S507.

In S507, the controller 80 executes a recording process. In the recording process, the controller 80 performs recording on the recording sheet P by repeatedly executing a recording pass in which the inkjet head 4 is controlled to eject ink from the plurality of nozzles 10 onto the recording sheet P while the carriage motor 86 is controlled to move the carriage 2 in the scanning direction, and a conveyance operation in which the conveyance motor 87 is controlled to cause the conveyance rollers 6 and 7 to convey the recording sheet P by a particular distance.

<Effects>

In the fourth embodiment, inspection driving is performed at a particular time, and it is determined whether to perform suction purge based on the driving result. After that, when recording on the recording sheet P is performed, suction purge is performed based on the result of the determination. As a result, when the particular time is set to a time such as late night or early morning when it is desirable to minimize the generation of noise, the suction purge is not performed at the particular time, thereby suppressing the generation of noise.

When it is determined that suction purge is to be performed at a particular time, flushing is performed immediately after that, and purge is performed immediately before recording on the recording sheet P is first performed after the flushing. As a result, when the particular time is set to a time such as late night or early morning when it is desirable to minimize the generation of noise, the suction purge is not performed at the particular time, thereby suppressing the generation of noise. By performing flushing immediately after the determination, the abnormal nozzles are recovered to some extent. Since flushing generates less noise than purge, almost no noise is generated even if flushing is performed at the particular time. When it is determined to perform the suction purge, since the suction purge is performed immediately before recording on the recording sheet P for the first time after that, the recording on the recording sheet P is performed after recovering the abnormal nozzles.

FIFTH EMBODIMENT

Next, a fifth embodiment will be described. The fifth embodiment also relates to the printer 1 similarly to the first to fourth embodiments. In the fifth embodiment, while power is being supplied to the printer 1, the controller 80 performs processing according to the flow of FIG. 9.

Figure 9:
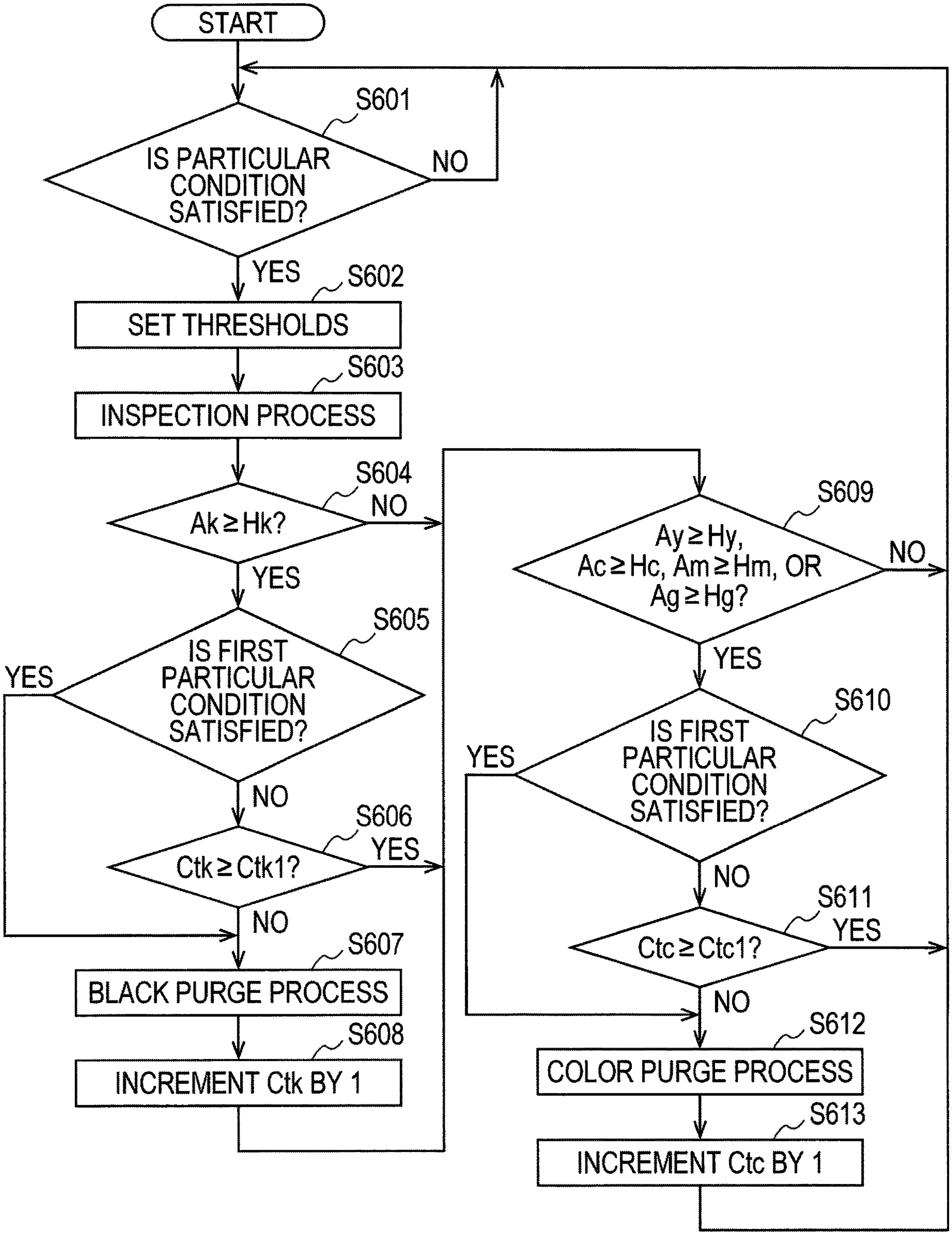
FIG. 9 is a flowchart showing a flow of processing performed when power is being supplied to a printer.

To explain the flow of FIG. 9, first, the controller 80 determines whether a particular condition is satisfied (S601). In the fifth embodiment, as shown in FIG. 10A, the flash memory 84 stores a list of first particular conditions and a list of second particular conditions as lists of particular conditions.

The first particular condition includes a condition that the cumulative number of printed sheets from the previous suction purge has reached a particular value. The first particular condition includes a condition that an abnormality affecting ink ejection has occurred in the printer 1. The abnormality that affects ink ejection is, for example, an abnormality in which the recording sheet P is jammed. The first particular condition includes a condition that recording is performed on the recording sheet P whose length in the conveyance direction is larger than or equal to a particular length. The first particular condition includes a condition that recording is continuously performed on a particular number of sheets of recording sheet P or more.

The second particular condition is a condition other than the first particular condition. In the fifth embodiment, the first particular condition is a condition that makes it more likely that the abnormal nozzle needs to be recovered by suction purge than when the second particular condition is satisfied. One example of the second particular condition is that the cumulative number of printed sheets from the previous suction purge has reached another particular value which is smaller than the particular value of item 1. of the first particular condition.

In S601, it is determined that the particular condition is satisfied when either the first particular condition or the second particular condition shown in FIG. 10A is satisfied. The controller 80 waits while the particular condition is not satisfied (S601: NO), and sets thresholds Hk, Hy, Hc, Hm, and Hg (S602) when the particular condition is satisfied (S601: YES).

In S602, as shown in FIG. 10B, the controller 80 sets the thresholds Hk, Hy, Hc, Hm, and Hg to Hk1, Hy1, Hc1, Hm1, and Hg1, respectively, when the first particular condition is satisfied, and sets the thresholds Hk, Hy, Hc, Hm and Hg to Hk2, Hy2, Hc2, Hm2 and Hg2, respectively, when the second particular condition is satisfied. Hk1 is smaller than Hk2, Hy1 is smaller than Hy2, Hc1 is smaller than Hc2, Hm1 is smaller than Hm2, and Hg1 is smaller than Hg2. Hg1 is larger than Hk1, Hy1, Hc1 and Hm1 and smaller than the sum (Hy1+Hc1+Hm1) of Hy1, Hc1 and Hm1. Hg2 is larger than Hk2, Hy2, Hc2 and Hm2 and smaller than the sum (Hy2+Hc2+Hm2) of Hy2, Hc2 and Hm2.

Returning to FIG. 9, after S602, the controller 80 executes the same inspection process as in S102 of the first embodiment (S603). Subsequently, the controller 80 determines whether the number Ak of abnormal nozzles is larger than or equal to the threshold Hk based on the result of the inspection process of S603 (S604). If the number Ak of abnormal nozzles is smaller than the threshold Hk (S604: NO), the process proceeds to S609.

If the number Ak of abnormal nozzles is larger than or equal to the threshold Hk (S604: YES), the controller 80 determines whether the first particular condition is satisfied (S605). If the first particular condition is satisfied (S605: YES), the process proceeds to S607. If the first particular condition is not satisfied (that is, the second particular condition is satisfied) (S605: NO), the controller 80 determines whether a purge count Ctk is larger than or equal to a particular count Ctk1 (S606). The purge count Ctk is the number of times of black suction purge performed within a particular period T1. The purge count Ctk is reset to 0 when power is first supplied to the printer 1. As will be described later, the purge count Ctk is reset to 0 each time the particular period T1 elapses. The purge count Ctk is incremented by 1 each time the black suction purge is performed.

If the purge count Ctk is larger than or equal to the particular count Ctk1 (S606: YES), the process proceeds to S609. If the purge count Ctk is smaller than the particular count Ctk1 (S606: NO), the process proceeds to S607.

In S607, the controller 80 executes the same black purge process as in S104 of the first embodiment. After the black suction purge is performed by the black purge process of S607, the controller 80 increments the purge count Ctk by 1 (S608), and the process proceeds to S609.

In S609, the controller 80 makes the same determination as in S105 of the first embodiment. If none of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg is satisfied (S609: NO), the process returns to S601.

If at least one of these conditions is satisfied (S609: YES), the controller 80 determines whether the first particular condition is satisfied (S610), as in S605. If the first particular condition is satisfied (S610: YES), the process proceeds to S612. If the first particular condition is not satisfied (that is, the second particular condition is satisfied) (S610: NO), the controller 80 determines whether the purge count Ctc is larger than or equal to a particular count Ctc1 (S611). The purge count Ctc is the number of times of color suction purge performed within the particular period T1. The purge count Ctc is reset to 0 when power is first supplied to the printer 1. As will be described later, the purge count Ctc is reset to 0 each time the particular period T1 elapses. The purge count Ctc is incremented by 1 each time the color suction purge is performed.

If the purge count Ctc is larger than or equal to the particular count Ctc1 (S611: YES), the process returns to S601. If the purge count Ctc is smaller than the particular count Ctc1 (S611: NO), the process proceeds to S612.

In S612, the controller 80 executes the same color purge process as in S106 of the first embodiment. After the color suction purge is performed by the color purge process of S612, the controller 80 increments the purge count Ctc by 1 (S613), and then, the process returns to S601.

In the fifth embodiment, while power is being supplied to the printer 1, processing is performed according to the flow of FIG. 10C in order to reset the purge counts Ctk and Ctc. To explain the flow of FIG. 10C in detail, the controller 80 determines whether an elapsed time Tis longer than or equal to the particular time T1 (S701). The elapsed time T is the elapsed time after being reset to zero. The elapsed time T is reset to 0 when power is supplied to the printer 1 for the first time.

The controller 80 waits while the elapsed time T is smaller than the particular time T1 (S701: NO). When the elapsed time T becomes longer than or equal to the particular time T1 (S701: YES), the controller 80 resets the purge counts Ctk and Ctc to 0 (S702), and resets the elapsed time T to 0 (S703), and then, the process returns to S701.

<Effects>

In the fifth embodiment, it is determined whether to perform color suction purge by setting the thresholds Hy, Hc, Hm, and Hg to different values between when the first particular condition is satisfied and when the second particular condition is satisfied. Thereby, it is appropriately determined whether to perform the color suction purge depending on the state of the printer 1.

In the fifth embodiment, the first particular condition is a condition that makes it more likely that the color suction purge is required than when the second particular condition is satisfied. When the first particular condition is satisfied, the thresholds Hy, Hc, Hm, and Hg are set to be smaller values than when the second particular condition is satisfied, and it is determined whether to perform the color suction purge. Thus, when the printer 1 is in a situation where it is likely that the color suction purge is required, it is likely to be determined that the color suction purge is to be performed.

In the fifth embodiment, when the second particular condition is satisfied, it is less likely that the suction purge is required than when the first particular condition is satisfied. Thus, in the fifth embodiment, when it is determined that the black and color suction purges are to be performed when the second particular condition is satisfied, the number of times of suction purge is limited so that black and color purges are not performed the particular numbers of times Ctk1 and Ctc1 or more, respectively, within the particular period T1. In this way, the amount of ink discharged is suppressed.

In the fifth embodiment, when the first particular condition is satisfied, it is more likely that suction purge is required than when the second particular condition is satisfied. Thus, in the fifth embodiment, when it is determined that the black and color suction purges are to be performed when the first particular condition is satisfied, the numbers of times of black and color suction purges are not limited within the particular period T. In this way, suction purge is performed appropriately when the printer 1 is in a situation where it is highly likely that the suction purge is required.

SIXTH EMBODIMENT

Next, a sixth embodiment will be described. The sixth embodiment also relates to the printer 1 similarly to the first to fifth embodiments.

However, in the sixth embodiment, either one of a black weak purge and a black strong purge is selectively performed as the black suction purge. The black strong purge has a stronger force for discharging ink from the nozzles 10 than the black weak purge. For example, the driving time of the suction pump 73 in the black strong purge is longer than that in the black weak purge. Alternatively, for example, the rotation speed of the suction pump 73 in the black strong purge is higher than that in the black weak purge. Alternatively, for example, in the black strong purge, the driving time of the suction pump 73 is longer and the rotation speed of the suction pump 73 is higher than that in the black weak purge.

In the sixth embodiment, either one of a color weak purge ("first purge") and a color strong purge ("second purge") is selectively performed as the color suction purge. The color strong purge has a stronger force for discharging ink from the nozzles 10 than the color weak purge. For example, the driving time of the suction pump 73 in the color strong purge is longer than that in the color weak purge. Alternatively, for example, the rotation speed of the suction pump 73 in the color strong purge is higher than that in the color weak purge. Alternatively, for example, in the color strong purge, the driving time of the suction pump 73 is longer and the rotation speed of the suction pump 73 is higher than that in the color weak purge.

In the sixth embodiment, when the user operates the operation interface 68 ("signal receiver") to give an instruction to perform the suction purge, the operation interface 68 receives a purge instruction signal to perform the suction purge based on the operation and transmits the received purge instruction signal to the controller 80. The controller 80 performs processing according to the flow of FIG. 11 in response to receiving the purge instruction signal.

Figure 11:
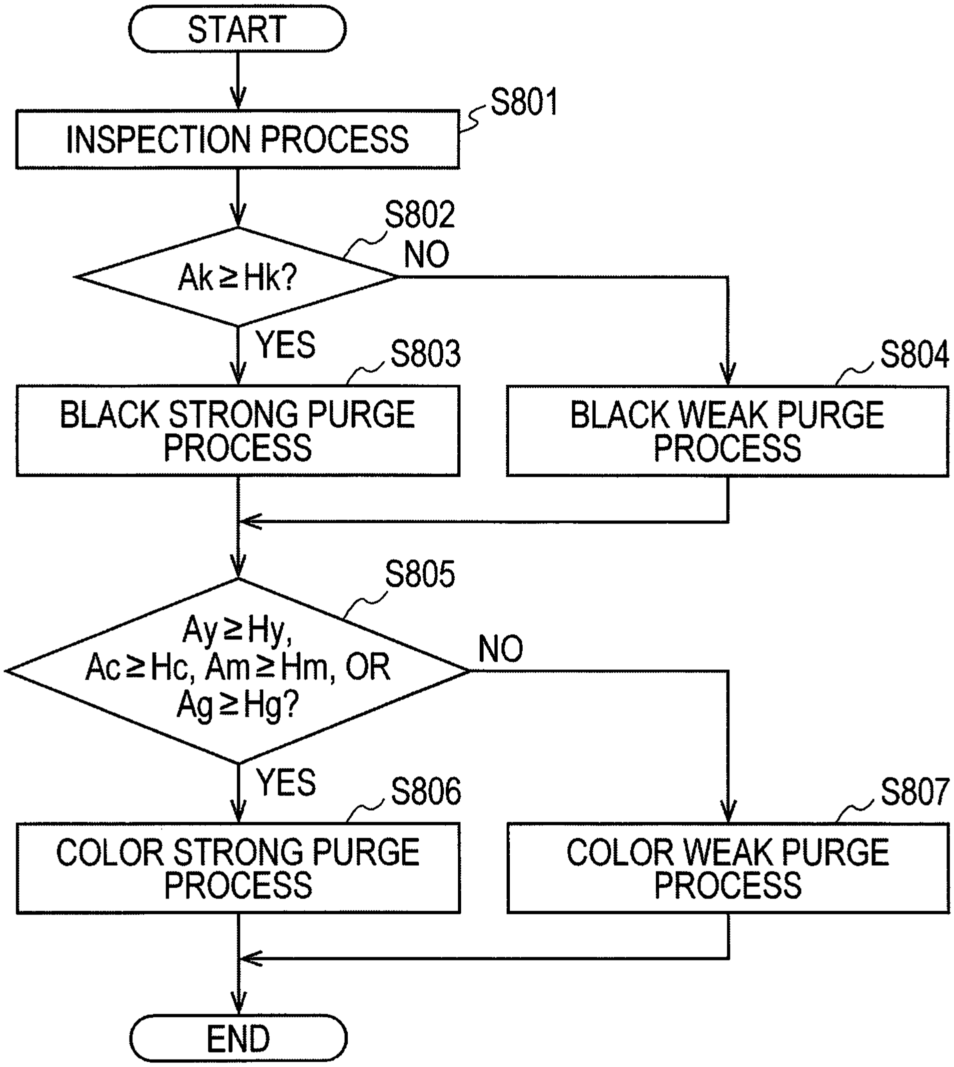
FIG. 11 is a flowchart showing a flow of processing performed when a purge instruction signal is received.

To explain the flow of FIG. 11 in detail, the controller 80 executes the same inspection process as in S102 of the first embodiment (S801). Subsequently, the controller 80 determines whether the number Ak of abnormal nozzles is larger than or equal to the threshold Hk, as in S103 of the first embodiment (S802).

If the number Ak of abnormal nozzles is larger than or equal to the threshold Hk (S802: YES), the controller 80 executes a black strong purge process (S803), and then the process proceeds to S805. In the black strong purge process, the controller 80 controls the switching unit 72, the suction pump 73, and so on to perform the black strong purge described above.

If the number Ak of abnormal nozzles is smaller than the threshold Hk (S802: NO), the controller 80 executes a black weak purge process (S804), and then, the process proceeds to S805. In the black weak purge process, the controller 80 controls the switching unit 72, the suction pump 73, and so on to perform the black weak purge described above.

In S805, the controller 80 makes the same determination as in S105 of the first embodiment. When at least one of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg is satisfied (S805: YES), the controller 80 executes a color strong purge process (S806), and the process ends. In the color strong purge process, the controller 80 controls the switching unit 72, the suction pump 73, and so on to perform the color strong purge described above.

If none of these conditions is satisfied (S805: NO), the controller 80 executes a color weak purge process (S807) and the process ends. In the color weak purge process, the controller 80 controls the switching unit 72, the suction pump 73, and so on to perform the color weak purge described above.

<Effects>

In the sixth embodiment, either a color weak purge or a color strong purge having a stronger ink discharging force than the color weak purge is selectively performed Here, the amount of ink discharged in the color strong purge is larger than that in the color weak purge. Thus, in the sixth embodiment, a color strong purge with a strong ink discharging force is performed when at least one of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg is satisfied. As a result, the abnormal nozzles are reliably recovered. If none of these conditions is satisfied, a color weak purge with a weak ink discharging force is performed. As a result, the amount of ink discharged is suppressed while recovering abnormal nozzles.

When the user gives an instruction to perform the suction purge, if the black suction purge is not performed just because the number Ak of abnormal nozzles is smaller than the threshold Hk, the user may feel dissatisfied or misunderstand that the printer 1 is out of order. Similarly, if the color suction purge is not performed just because none of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg is satisfied, the user may feel dissatisfied or misunderstand that the printer 1 is out of order. Thus, in the sixth embodiment, when the user gives an instruction to perform the suction purge, the black weak purge is performed even if the number Ak of abnormal nozzles is smaller than the threshold Hk. When the user gives an instruction to perform the suction purge, the color weak purge is performed even if none of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg is satisfied. This prevents the user from feeling dissatisfied or misunderstanding that the printer 1 is out of order. The amount of ink discharged is suppressed while recovering abnormal nozzles by black weak purge and color weak purge.

SEVENTH EMBODIMENT

Figure 12:
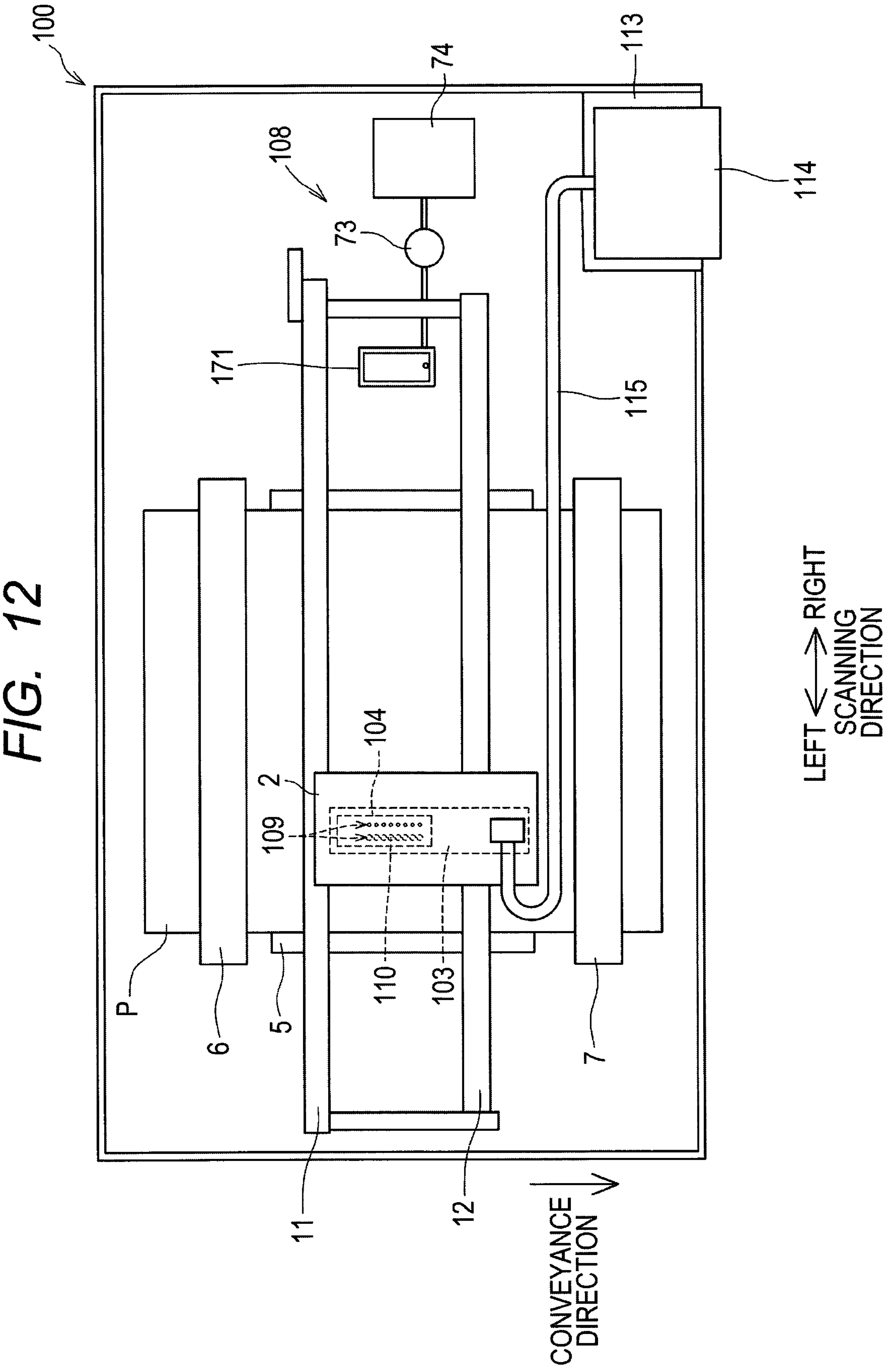
FIG. 12 is a diagram showing a schematic configuration of a printer.

Next, a seventh embodiment will be described. As shown in FIG. 12, a printer 100 according to the seventh embodiment is obtained by partially changing the configuration of the printer 1.

Specifically, in the printer 100, the sub-tank 103 is connected to one ink cartridge 114 attached to the cartridge holder 113 via one tube 115. One color Ink is supplied from one ink cartridge 114 to the sub-tank 103, and the color ink is supplied from the sub-tank 103 to the inkjet head 104.

In the printer 100, the inkjet head 104 has two nozzle arrays 109 arranged in the scanning direction. The nozzles 10 forming the right nozzle array 109 have a smaller diameter than the nozzles 10 forming the left nozzle array 109. Thus, the ink ejection conditions of the nozzles 10 differ between the right nozzle array 109 and the left nozzle array 109. In the seventh embodiment, one nozzle array 109 of the two nozzle arrays 109 is an example of "first nozzle group", and the other nozzle array 109 is an example of "second nozzle group".

In the printer 100, a maintenance unit 108 does not have the switching unit 72 (see FIG. 1), and a cap 171 is directly connected to the suction pump 73. When the cap lifting mechanism 88 (see FIG. 4) lifts the cap 171 while the carriage 2 is located at the maintenance position, the plurality of nozzles 10 forming the two nozzle arrays 109 are covered with the cap 171. By driving the suction pump 73 while the plurality of nozzles 10 forming the two nozzle arrays 109 are covered with the cap 171, suction purge for discharging ink from the plurality of nozzles 10 forming the two nozzle arrays 109 is performed.

Figure 13:
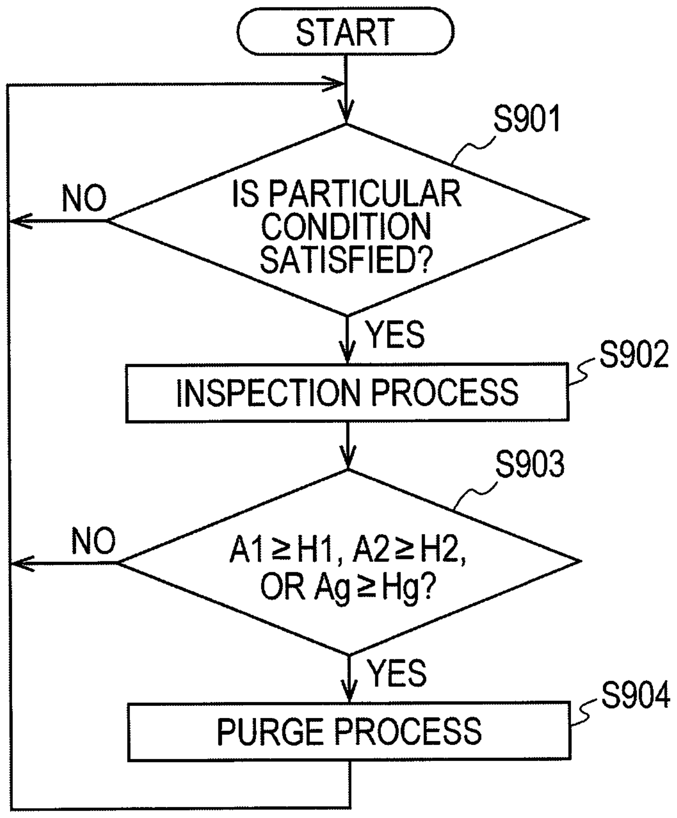
FIG. 13 is a flowchart showing a flow of processing performed when power is being supplied to a printer.

While power is being supplied to the printer 100, the controller 80 performs processing according to the flow of FIG. 13. To explain the flow of FIG. 13 in detail, the controller 80 waits while the particular condition is not satisfied (S901: NO), and executes the same inspection process as in S102 of the first embodiment when the particular condition is satisfied (S901: YES).

Subsequently, based on the result of the inspection process in S902, the controller 80 determines whether any one of the conditions including the condition that the number A1 of abnormal nozzles in the right nozzle array 109 is larger than or equal to a threshold H1, the condition that the number A2 of abnormal nozzles in the left nozzle array 109 is larger than or equal to a threshold H2, and the condition ("third purge condition") that the total number Ag (=A1+A2) of abnormal nozzles, which is the sum of the numbers of abnormal nozzles in the two nozzle arrays 9, is larger than or equal to the threshold Hg is satisfied (S903).

The thresholds H1 and H2 are different values. The threshold Hg is larger than the thresholds H1 and H2 and smaller than the sum (H1+H2) of the thresholds H1 and H2. In the seventh embodiment, the abnormal nozzle in the nozzle array 109 corresponding to the first nozzle group is an example of "first abnormal nozzle", and the abnormal nozzle in the nozzle array 109 corresponding to the second nozzle group is an example of "second abnormal nozzle". Among the numbers A1 and A2 of abnormal nozzles, the number of abnormal nozzles corresponding to the first nozzle group is an example of "number of first abnormal nozzles", and the number of abnormal nozzles corresponding to the second nozzle group is an example of "number of second abnormal nozzles". Among the thresholds H1 and H2, the threshold corresponding to the number of first abnormal nozzles is an example of "first threshold", and the threshold corresponding to the number of second abnormal nozzles is an example of "second threshold". Among the condition that the number A1 of abnormal nozzles is larger than or equal to the threshold H1 and the condition that the number A2 of abnormal nozzles is larger than or equal to the threshold H2, the condition corresponding to the number of first abnormal nozzles and the first threshold is an example of "first purge condition", and the condition corresponding to the number of second abnormal nozzles and the second threshold is an example of "second purge condition".

If none of the conditions including the condition that the number A1 of abnormal nozzles is larger than or equal to the threshold H1, the condition that the number A2 of abnormal nozzles is larger than or equal to the threshold H2, and the condition that the total number Ag of abnormal nozzles is larger than or equal to the threshold Hg is satisfied (S903: NO), the process returns to S901. If at least one of these conditions is satisfied (S903: YES), the controller 80 executes the purge process (S904), and then, the process returns to S901. In the purge process, the controller 80 controls the suction pump 73 and so on to perform the suction purge described above.

<Effects>

In the seventh embodiment, the two nozzle arrays 109 have nozzles 10 with different diameters. When the suction purge is performed by covering the plurality of nozzles 10 forming the two nozzle arrays 109 with the cap 171, suction purge is performed appropriately in accordance with the number of abnormal nozzles.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

For example, in the first to sixth embodiments, a threshold is set for the number of abnormal nozzles for each of the three nozzle arrays 9 covered by the cap portion 71*b*, and a threshold is set for the total number of abnormal nozzles using the sum of numbers of abnormal nozzles in these three nozzle arrays 9 as the total number of abnormal nozzles, and it is determined whether to perform the suction purge, but the present disclosure is not limited thereto. For example, a threshold may be set for the number of abnormal nozzles for each of two of the three nozzle arrays 9 covered with the cap portion 71*b*. The sum of the numbers of abnormal nozzles in two of the three nozzle arrays 9 covered with the cap portion 71*b* may be used as the total number of abnormal nozzles, and a threshold may be set for the total number of abnormal nozzles.

In the first to sixth embodiments, the inkjet head 4 has three nozzle arrays 9 with different characteristics of the ink ejected from the nozzles 10 and covered with the cap portion 71*b*, but the present disclosure is not limited thereto. The inkjet head 4 may have two or four or more nozzle arrays 9 with different characteristics of ink ejected from the nozzles 10 and covered with the cap portion 71*b*. In this case, a threshold may be set for the number of abnormal nozzles for each of at least two nozzle arrays 9 among these two or four or more nozzle arrays 9, a threshold may be set for the total number of abnormal nozzles using the number of abnormal nozzles in at least two nozzle arrays 9 among these two or four nozzle arrays 9 as the total number of abnormal nozzles, and it may be determined whether to perform the suction purge.

In the seventh embodiment, the inkjet head 104 has two nozzle arrays 109 with nozzles 10 having different diameters and covered with the cap 171, but the present disclosure is not limited thereto. The inkjet head 104 may have three or more nozzle arrays 109 with nozzles 10 having different diameters and covered with cap 171. In this case, a threshold may be set for the number of abnormal nozzles for each of at least two nozzle arrays 109 among these three or more nozzle arrays 109, a threshold may be set for the total number of abnormal nozzles using the number of abnormal nozzles in at least two nozzle arrays among these three or more nozzle arrays 109 as the total number of abnormal nozzles, and it may be determined whether to perform suction purge.

In the first to sixth embodiments, the characteristics of the ink ejected from the nozzles 10 differ between the nozzle arrays 9 depending on the color of the ink ejected from the nozzles 10, whether the ink ejected from the nozzles 10 contains a pigment or dye, and the conditions regarding the viscosity of the ink ejected from the nozzles 10, but the present disclosure is not limited thereto. Only some of these characteristics may be different between the nozzle arrays 9. Alternatively, the characteristics other than these characteristics of the ink ejected from the nozzles 10 may be different between the nozzle arrays 9.

In the first to sixth embodiments, the ink ejection conditions for the nozzles 10 are different because the characteristics of the ink ejected from the nozzles 10 are different between the nozzle arrays 9. In the seventh embodiment, the ink ejection conditions of the nozzles 10 are different because the diameters of the nozzles 10 are different between the nozzle arrays 109. However, the present disclosure is not limited thereto. The ink ejection conditions of the nozzles 10 may be different between the nozzle arrays because the conditions other than these are different between the nozzle arrays.

In the first to sixth embodiments, the thresholds Hy, Hc and Hm are different from one another, but two or three of the thresholds Hy, Hc and Hm may be the same. In the seventh embodiment, although the threshold H1 and the threshold H2 are different, the threshold H1 and the threshold H2 may be the same value.

In the first to fourth and sixth embodiments, the threshold Hg is larger than any of Hy, Hc, and Hm and smaller than the sum of them (Hy+Hc+Hm). In the fifth embodiment, the threshold Hg1 is larger than any of Hy1, Hc1, and Hm1 and smaller than the sum of them (Hy1+Hc1+Hm1), and the threshold Hg2 is larger than any of Hy2, Hc2, and Hm2 and smaller than the sum of them (Hy2+Hc2+Hm2). However, the present disclosure is not limited thereto.

For example, in the first to fourth and sixth embodiments, the threshold Hg may be larger than two of the thresholds Hy, Hc, and Hm and smaller than the sum of these two thresholds. Similarly, in the fifth embodiment, for example, the threshold Hg1 may be larger than two of the thresholds Hy1, Hc1, and Hm1 and smaller than the sum of these two thresholds. In the fifth embodiment, for example, the threshold Hg2 may be larger than two of the thresholds Hy2, Hc2, and Hm2 and smaller than the sum of these two thresholds.

In the second embodiment, the inkjet head 4 is caused to perform color flushing to discharge color ink from the abnormal nozzles in the three nozzle arrays 9 on the left side when at least one of the conditions including the condition that the number Ay of abnormal nozzles is larger than or equal to the threshold Fy, the condition that the number Ac of abnormal nozzles is larger than or equal to the threshold Fc, the condition that the number Am of abnormal nozzles is larger than or equal to the threshold Fm, and the total number Ag of abnormal nozzles is larger than or equal to the threshold Fg is satisfied. However, the present disclosure is not limited thereto. For example, when only one or two of the three conditions including the condition that the number Ay of abnormal nozzles is larger than or equal to the threshold Fy, the condition that the number Ac of abnormal nozzles is larger than or equal to the threshold Fc, and the condition that the number Am of abnormal nozzles is larger than or equal to the threshold Fm is satisfied, flushing may be performed to discharge ink only from the abnormal nozzles in one or two nozzle arrays 9 corresponding to the one or two conditions.

In the third embodiment, in S105, when at least one of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg is satisfied, color flushing is performed and then a color inspection process is performed. Based on the result of the color inspection process, it is determined whether to perform color suction purge again. However, the present disclosure is not limited thereto.

For example, in S105 of the third embodiment, if only one or two of the three conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm is satisfied, in the color flushing process of S304, flushing may be performed to discharge ink from only abnormal nozzles in one or two nozzle arrays 9 corresponding to the one or two conditions, and then, the color inspection process may be executed.

Only some of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg may be used as conditions for determination in S105 and S306. In this case, for example, when conditions other than some of these conditions are satisfied in S105, the color suction purge may be performed without performing the color flushing.

In the fourth embodiment, when the number Ak of abnormal nozzles is larger than or equal to the threshold Hk at the particular time, black flushing is performed immediately after that, but this black flushing may not be performed. In the fourth embodiment, when at least one of the conditions including the condition that the number Ay of abnormal nozzles is larger than or equal to the threshold Hy, the condition that the number Ac of abnormal nozzles is larger than or equal to the threshold Hc, the condition that the number Am of abnormal nozzles is larger than or equal to the threshold Hm, and the condition that the total number Ag of abnormal nozzles is larger than or equal to the threshold Hg is satisfied at the particular time, the color flushing is performed immediately after that, but this color flushing may not be performed.

In the fourth embodiment, when it is determined that the black and color suction purges are to be performed based on the result of the inspection process executed at a particular time, the suction purge is performed immediately before the recording on the recording sheet P is performed for the first time, but the present disclosure is not limited thereto. For example, when it is determined that black and color suction purges are to be performed based on the result of inspection process executed at a particular time, these suction purges may be performed immediately after that determination.

In the fifth embodiment, the thresholds Hk, Hy, Hc, Hm, and Hg are all different between when the first particular condition is satisfied and when the second particular condition is satisfied, but the present disclosure is not limited thereto. Only some of the thresholds Hk, Hy, Hc, Hm, and Hg may be different between when the first particular condition is satisfied and when the second particular condition is satisfied.

The first particular condition in the fifth embodiment is not limited to the four conditions shown in FIG. 10A. For example, the first particular condition may include only some of the four conditions shown in FIG. 10A. Alternatively, for example, the first particular condition may include conditions other than the four conditions shown in FIG. 10A.

In the fifth embodiment, the number of times of the suction purge within the particular time T1 is limited when it is determined that the suction purge is to be performed when the second particular condition is satisfied, and the number of times of the suction purge within the particular time T1 is not limited when it is determined that the suction purge is to be performed when the first particular condition is satisfied, but the present disclosure is not limited thereto. For example, the number of times of suction purge within the particular time T1 may be limited when it is determined that the suction purge is to be performed when either the first particular condition or the second particular condition is satisfied. Alternatively, for example, the number of times of the suction purge within the particular time T1 may not be limited even when it is determined that the suction purge is to be performed when either the first particular condition or the second particular condition is satisfied.

In the fifth embodiment, the number of times of suction purge within the particular time T1 is limited, but the present disclosure is not limited thereto. For example, the number of times of suction purge in another particular cycle may be limited, such as limiting the number of times of suction purge during a period from the previous suction purge until recording is performed on a particular number of recording sheets P.

Although the operation interface 68 receives the purge instruction signal when the user operates the operation interface 68 to give an instruction to perform the suction purge, the present disclosure is not limited thereto. For example, the printer 1 may be connected to an external device such as a PC, and the user may operate the external device to give an instruction to perform the suction purge. In this case, the portion of the printer 1 connected to the external device is an example of “signal receiver”.

In the sixth embodiment, the processing is performed according to the flow of FIG. 11 when receiving the purge instruction signal from the user, but the present disclosure is not limited thereto. The processing may be performed according to the flow of FIG. 11 when a particular condition is satisfied rather than receiving the purge instruction signal from the user.

In the first to third, fifth, and seventh embodiments, when a particular condition is satisfied, the inspection process is executed to acquire abnormal nozzle information, and whether to perform suction purge based on this abnormal nozzle information is determined. However, the present disclosure is not limited thereto. For example, if a period from the timing at which the inspection process was last executed to the timing at which the particular condition is satisfied is short, the controller 80 may acquire the abnormal nozzle information stored in the previous inspection process from the flash memory 84 when the particular condition is satisfied and determine whether to perform suction purge based on the abnormal nozzle information.

In the above-described examples, the suction purge is performed as the purge, but the present disclosure is not limited thereto. For example, a pressure pump that pressurizes the ink inside the inkjet head 4 may be provided in a channel and so on between the ink cartridge 14 and the inkjet head 4. As the purge, a pressure purge may be performed by driving the pressure pump while the plurality of nozzles 10 are covered with the cap 71 to discharge the ink in the inkjet head 4. In this case, the cap 71 and the pressure pump constitute "purge unit".

Alternatively, both the suction purge by driving the suction pump 73 and the pressure purge by driving the pressure pump may be performed. In this case, the maintenance unit 8 and the pressure pump constitute "purge unit".

In the above-described examples, it is determined whether the nozzle 10 is an abnormal nozzle based on the signal output from the signal processing circuit 78 according to the voltage change in the electrode 76 arranged in the cap 71 when the inkjet head 4 is driven for inspection, but the present disclosure is not limited thereto.

For example, instead of the electrode 76, an electrode may be provided that extends vertically and faces the space below the nozzle 10 in a state where the carriage 2 is located at the maintenance position. The signal processing circuit 78 may output a signal corresponding to the change in the voltage of the electrode when the inspection driving is performed in a state where the carriage 2 is located at the maintenance position.

Alternatively, for example, an optical sensor may be provided that directly detects the ink ejected from the nozzles 10 and outputs a signal corresponding to the detection result in a state where the carriage 2 is located at a particular position such as the maintenance position. Based on the signal output from this optical sensor, it may be determined whether the nozzle 10 is an abnormal nozzle.

Alternatively, for example, as described in Japanese Patent No. 4929699, a voltage detection circuit that detects changes in voltage when ink is ejected from the nozzles may be connected to a plate on which nozzles of an inkjet head are formed. Then, it may be determined whether the nozzle is an abnormal nozzle based on a signal output from the voltage detection circuit when ink is ejected from the nozzles with the carriage moved to an inspection position.

Alternatively, for example, as described in Japanese Patent No. 6231759, the base board of the inkjet head may be provided with a temperature detection element. After a first application voltage is applied to drive the heater to eject ink, a second application voltage may be applied to drive the heater so as not to eject ink. Then, a signal corresponding to whether the nozzle 10 is an abnormal nozzle may be output based on a change in temperature detected by the temperature detection element during the period from the application of the second application voltage until the elapse of a particular period.

Alternatively, a particular test pattern may be recorded by the printer, and whether there is an abnormal nozzle may be determined based on the test pattern recording result. At this time, if the printer is a multifunction peripheral with a scanner, the test pattern may be read by the scanner to input the test pattern recording result. Alternatively, the test pattern recording result may be input by the user operating the operation interface 68 or an external device based on the test pattern recording result.

In the above-described examples, inspection driving is performed for all the nozzles 10 of the inkjet head 4 to determine whether the nozzles 10 are abnormal nozzles, but the present disclosure is not limited to this. For example, inspection driving may be performed for only some of the nozzles 10 of the inkjet head 4, such as every other nozzle 10 in each nozzle array 9, to determine whether the nozzles 10 are abnormal nozzles. Then, for the other nozzles 10, it may be inferred whether the nozzles 10 are abnormal nozzles based on the determination result for some of the nozzles 10 mentioned above.

In the above-described examples, it is determined whether the nozzle 10 is an abnormal nozzle based on whether ink has been ejected from the nozzle 10, but the present disclosure is not limited to this. For example, it may be determined whether the nozzle 10 is an abnormal nozzle based on the ink ejection direction, the ejection speed, and so on.

In the above-described examples, the present disclosure is applied to a printer including a so-called serial head that ejects ink from a plurality of nozzles while moving in the scanning direction with the carriage, but the present disclosure is not limited to this. For example, the present disclosure may be applied to a printer including a so-called line head extending over the entire length of the recording sheet in the scanning direction.

In the above-described examples, the present disclosure is applied to a printer that records on the recording sheet P by ejecting ink from nozzles, but the present disclosure is not limited to this. The present disclosure may be applied to a printer that records an image on a recording medium other than a recording sheet, such as a T-shirt, a sheet for outdoor advertising, a case for mobile terminal such as a smartphone, cardboard, and a resin member. Further, the present disclosure may also be applied to a liquid ejection apparatus that ejects liquid other than ink, such as liquid resin or metal, for example.

What is claimed is:

1. A liquid ejection apparatus comprising:

a head including a plurality of types of nozzle groups, each of the plurality of types of nozzle groups being formed by nozzles, the plurality of types of nozzle groups having different liquid ejection conditions, the plurality of types of nozzle groups including a first nozzle group and a second nozzle group;

a cap configured to cover the nozzles forming the plurality of types of nozzle groups;

a pump configured to apply pressure to liquid in the head; and a controller configured to perform:

in a case where a particular condition is satisfied, acquiring abnormal nozzle information, the abnormal nozzle information relating to a number of first abnormal nozzles, a number of second abnormal nozzles, and a total number of abnormal nozzles, the first abnormal nozzles being abnormal nozzles having abnormality in ejection of liquid among the nozzles forming the first nozzle group, the second abnormal nozzles being the abnormal nozzles among the nozzles forming the second nozzle group, the total number of abnormal nozzles being a total number of the abnormal nozzles among the nozzles forming at least two nozzle groups of the plurality of types of nozzle groups;

determining, based on the abnormal nozzle information, whether a purge is to be performed, the determining including determining that the purge is to be performed in a case where at least one of a plurality of purge conditions is satisfied, the plurality of purge conditions including a first purge condition that the number of the first abnormal nozzles is larger than or equal to a first threshold, a second purge condition that the number of the second abnormal nozzles is larger than or equal to a second threshold, and a third purge condition that the total number of abnormal nozzles is larger than or equal to a third threshold; and in response to determining that the purge is to be performed, controlling the pump to perform the purge, the purge being discharging liquid from the nozzles forming the plurality of types of nozzle groups by driving the pump in a state where the cap covers the nozzles forming the plurality of types of nozzle groups.

2. The liquid ejection apparatus according to claim 1, wherein the plurality of types of nozzle groups further includes a third nozzle group;

wherein the abnormal nozzle information is information relating to the number of first abnormal nozzles, the number of second abnormal nozzles, a number of third abnormal nozzles that are the abnormal nozzles among the nozzles forming the third nozzle group, and the total number of abnormal nozzles; and wherein the controller is configured to:

determine that the purge is to be performed in a case where at least one of the plurality of purge conditions is satisfied, the plurality of purge conditions including the first purge condition, the second purge condition, the third purge condition, and a fourth purge condition that the number of third abnormal nozzles is larger than or equal to a fourth threshold.

3. The liquid ejection apparatus according to claim 1, wherein the liquid ejection conditions include a condition relating to a diameter of the nozzles.

4. The liquid ejection apparatus according to claim 1, wherein the liquid ejection conditions include a condition relating to characteristics of liquid that is ejected.

5. The liquid ejection apparatus according to claim 4, wherein the condition relating to characteristics of liquid includes a condition relating to a color of the liquid.

6. The liquid ejection apparatus according to claim 4, wherein the condition relating to characteristics of liquid includes a condition of whether the liquid contains a pigment or a dye.

7. The liquid ejection apparatus according to claim 4, wherein the condition relating to characteristics of liquid includes a condition relating to viscosity of the liquid.

8. The liquid ejection apparatus according to claim 1, wherein the first threshold differs from the second threshold.

9. The liquid ejection apparatus according to claim 1, wherein the third threshold is smaller than a sum of the first threshold and the second threshold, and is larger than each of the first threshold and the second threshold.

10. The liquid ejection apparatus according to claim 1, wherein the controller is configured to:

in response to determining that the purge is not to be performed and that a number of the first abnormal nozzles is larger than or equal to a flushing threshold and smaller than the first threshold, determine that flushing is to be performed by the head, the flushing being discharging liquid from the first abnormal nozzles, the flushing threshold being smaller than the first threshold.

11. The liquid ejection apparatus according to claim 1, wherein the controller is configured to:

in response to determining that the first purge condition is satisfied, control the head to perform flushing of discharging liquid from the first abnormal nozzles, and then acquire the abnormal nozzle information again; and in response to determining that the abnormal nozzle information acquired again satisfies at least one of the plurality of purge conditions, determine that the purge is to be performed.

12. The liquid ejection apparatus according to claim 1, wherein the controller is configured to:

in response to determining that the first purge condition and the second purge condition are satisfied, control the head to perform flushing of discharging liquid from at least the first abnormal nozzles and the second abnormal nozzles, and then acquire the abnormal nozzle information again; and in response to determining that the abnormal nozzle information acquired again satisfies at least one of the plurality of purge conditions, determine that the purge is to be performed.

13. The liquid ejection apparatus according to claim 1, wherein the controller is configured to:

in response to determining that the third purge condition is satisfied, control the head to perform flushing of discharging liquid from the abnormal nozzles among the nozzles forming the plurality of types of nozzle groups, and then acquire the abnormal nozzle information again; and in response to determining that the abnormal nozzle information acquired again satisfies at least one of the plurality of purge conditions, determine that the purge is to be performed.

14. The liquid ejection apparatus according to claim 1, further comprising a signal transmission circuit configured to, in response to performing inspection driving for ejecting liquid from the nozzles forming the plurality of nozzles groups in the head, transmit signals depending on whether the nozzles are the abnormal nozzles, wherein the particular condition includes a condition that a particular time has come;

wherein the controller is configured to:

control the head to perform the inspection driving at the particular time;

acquire the abnormal nozzle information based on the signals transmitted from the signal transmission circuit when the inspection driving is performed, and determine whether the purge is to be performed based on the abnormal nozzle information; and in response to determining that the purge is to be performed, control the pump to perform the purge immediately before liquid is first ejected to an ejection medium from the nozzles forming the plurality of nozzles groups after determining that the purge is to be performed.

15. The liquid ejection apparatus according to claim 14, wherein the controller is configured to:

immediately after determining that the purge is to be performed, control the head to perform flushing of discharging liquid from the abnormal nozzles among the nozzles forming the plurality of nozzles groups.

16. The liquid ejection apparatus according to claim 1, wherein the particular condition is a condition that either a first particular condition or a second particular condition is satisfied, the second particular condition being different from the first particular condition; and wherein the controller is configured to:

set at least the first threshold, the second threshold or the third threshold to different values between when the first particular condition is satisfied and when the second particular condition is satisfied; and determine whether the purge is to be performed, based on the set first threshold, second threshold or third threshold.

17. The liquid ejection apparatus according to claim 16, further comprising a conveyor configured to convey an ejection medium in a conveyance direction, wherein the first particular condition includes at least:

a condition that a cumulative value of a number of ejection mediums on which liquid is ejected after the purge of a previous time reaches a particular value;

a condition that an abnormality occurs that affects ejection of liquid from at least one of the nozzles forming the plurality of nozzles groups in the liquid ejection apparatus;

a condition that liquid is ejected to an ejection medium having a length in the conveyance direction that is longer than or equal to a particular length; or a condition that liquid is continuously ejected to ejection mediums of a particular number or more;

wherein the second particular condition is a condition other than the first particular condition; and wherein the controller is configured to:

when the first particular condition is satisfied, set at least the first threshold, the second threshold or the third threshold to a smaller value than when the second particular condition is satisfied; and determine whether the purge is to be performed, based on the set first threshold, second threshold or third threshold.

18. The liquid ejection apparatus according to claim 17, wherein the controller is configured to:

in response to determining that the purge is to be performed when the second particular condition is satisfied, limit a number of times of the purge such that the purge is not performed a particular number of times or more in a particular cycle.

19. The liquid ejection apparatus according to claim 18, wherein the controller is configured to:

in response to determining that the purge is to be performed when the first particular condition is satisfied, not limit the number of times of the purge in the particular cycle.

* * * * *